(12) United States Patent
Mattice et al.

(10) Patent No.: US 7,638,082 B2
(45) Date of Patent: Dec. 29, 2009

(54) COMPRESSION MOLDING MACHINE

(75) Inventors: Daniel L. Mattice, N. Columbia City, IN (US); B. Jack Rote, Sturgis, MI (US)

(73) Assignee: Rexam Closure Systems Inc., Perrysburg, OH (US)

(*) Notice: Subject to any disclaimer, the term of this patent is extended or adjusted under 35 U.S.C. 154(b) by 0 days.

(21) Appl. No.: 12/002,447

(22) Filed: Dec. 17, 2007

(65) Prior Publication Data
US 2008/0136058 A1 Jun. 12, 2008

Related U.S. Application Data

(62) Division of application No. 11/109,374, filed on Apr. 19, 2005, now Pat. No. 7,331,777.

(51) Int. Cl.
*B28B 3/00* (2006.01)
(52) U.S. Cl. .................................. 264/297.6
(58) Field of Classification Search ............. 264/297.6; 425/348, 345
See application file for complete search history.

(56) References Cited

U.S. PATENT DOCUMENTS

| | | | |
|---|---|---|---|
| 2,027,915 A | | 1/1936 | Kux |
| 2,471,139 A | | 5/1949 | Benander et al. |
| 3,210,805 A | * | 10/1965 | Mikihiko Hanai .......... 425/298 |
| 3,635,612 A | | 1/1972 | Fortin et al. |
| 3,730,665 A | | 5/1973 | Fortin et al. |
| 3,764,250 A | | 10/1973 | Waterloo |
| 3,829,272 A | | 8/1974 | Carillon et al. |
| 3,938,928 A | | 2/1976 | Andrews |
| 4,028,038 A | | 6/1977 | Haigh |
| 4,370,124 A | | 1/1983 | Buja |
| 5,645,870 A | | 7/1997 | Larsen |
| 5,670,100 A | | 9/1997 | Ingram |
| 5,786,079 A | | 7/1998 | Alieri |
| 5,840,349 A | | 11/1998 | Brown, Jr. et al. |
| 6,179,605 B1 | | 1/2001 | Littleton et al. |
| 6,736,628 B1 | | 5/2004 | Zuffa |
| 2001/0051193 A1 | | 12/2001 | Lichtinger |
| 2003/0003187 A1 | | 1/2003 | Coran et al. |
| 2003/0189274 A1 | * | 10/2003 | Graham et al. ............... 264/318 |
| 2003/0198708 A1 | | 10/2003 | Pucci |
| 2004/0145087 A1 | * | 7/2004 | Cerny et al. .................. 264/335 |

FOREIGN PATENT DOCUMENTS

| | | | |
|---|---|---|---|
| DE | 20301508 | | 4/2003 |
| GB | 985691 | | 3/1965 |
| GB | A-985 691 | * | 3/1965 |

* cited by examiner

*Primary Examiner*—Khanh Nguyen
*Assistant Examiner*—Saeed M Huda
(74) *Attorney, Agent, or Firm*—Reising Ethington PC

(57) ABSTRACT

A compression molding machine includes a wheel mounted for rotation around a horizontal axis and a plurality of angularly spaced molds disposed around the wheel. Each of the molds includes a first mold segment and a second mold segment disposed radially outwardly of the first mold segment. Each of the second mold segments is movable radially with respect to the associated first mold segment between a radially inner closed position with the first mold segment for compression molding a plastic article, and a radially outer open position spaced from the associated first mold segment for removing a molded article from the mold and placing a mold charge into the mold.

3 Claims, 32 Drawing Sheets

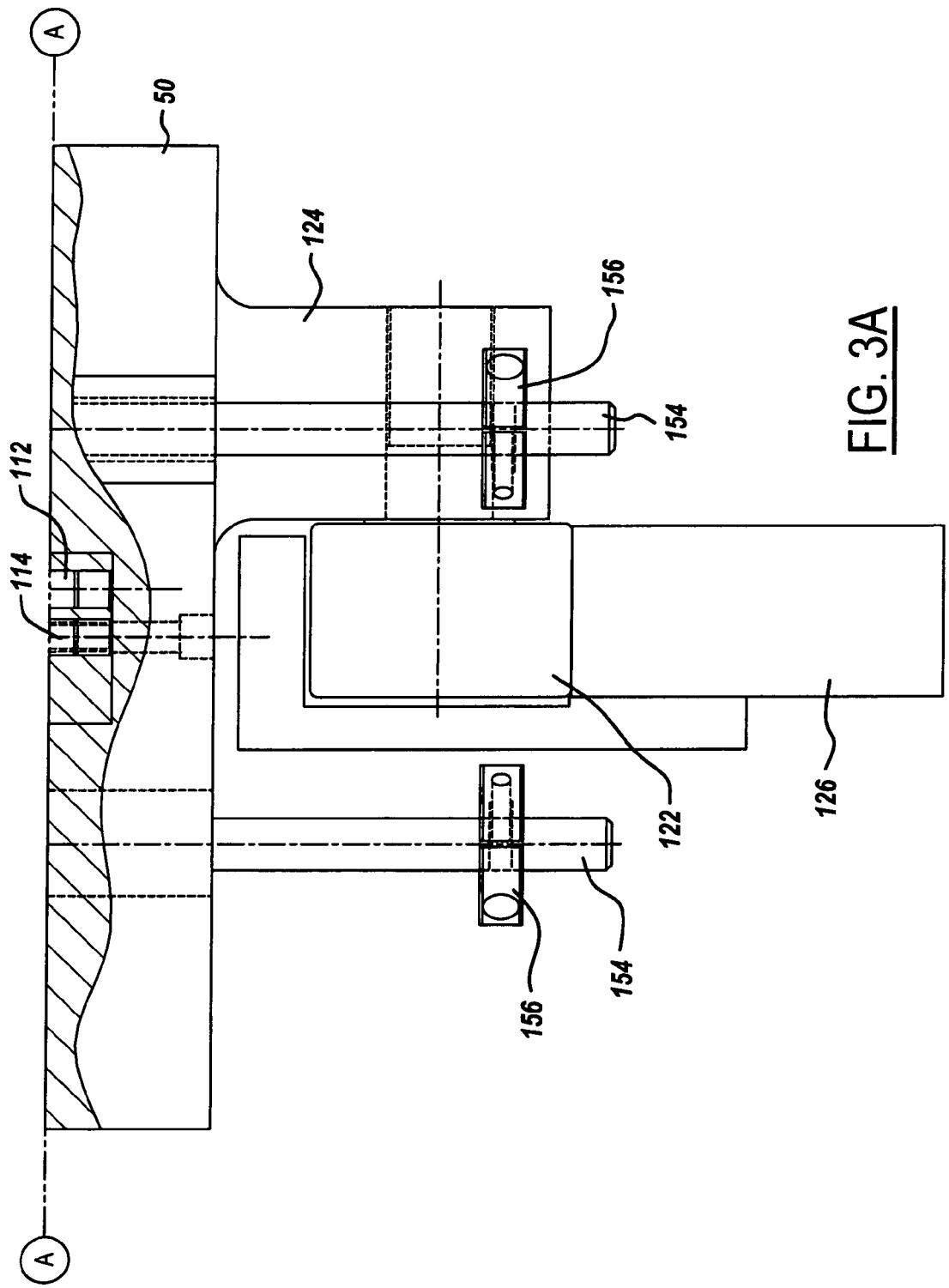

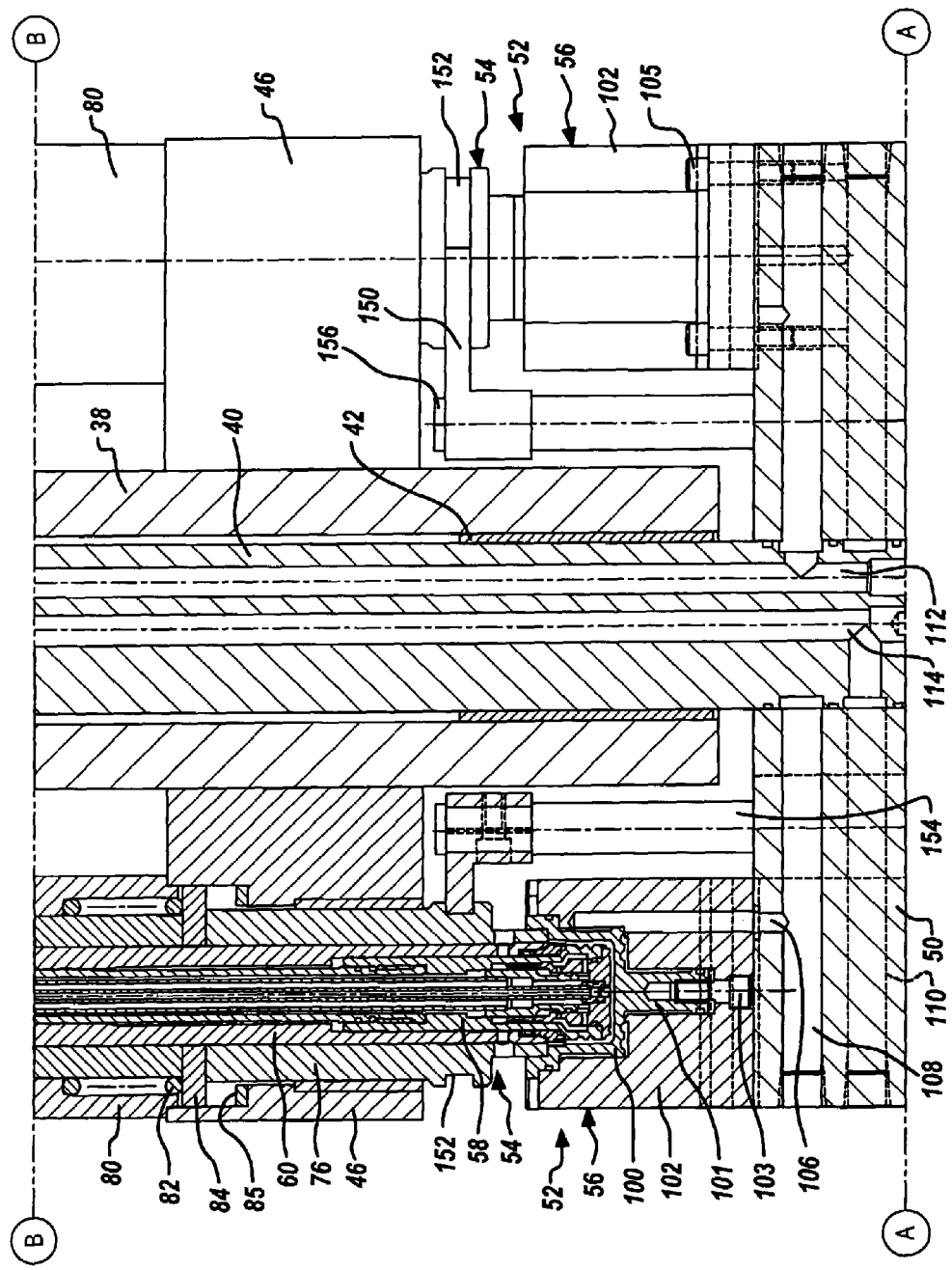

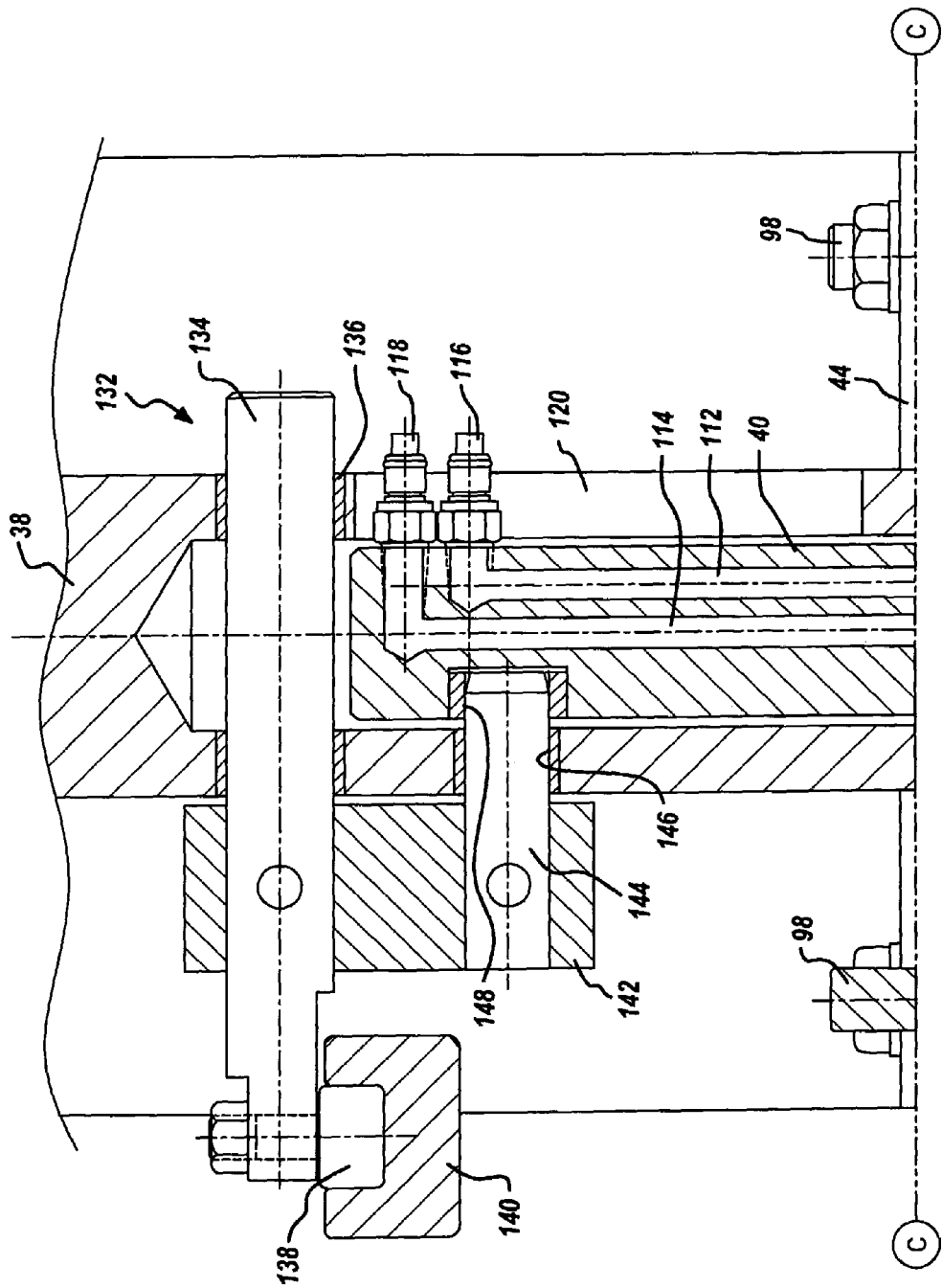

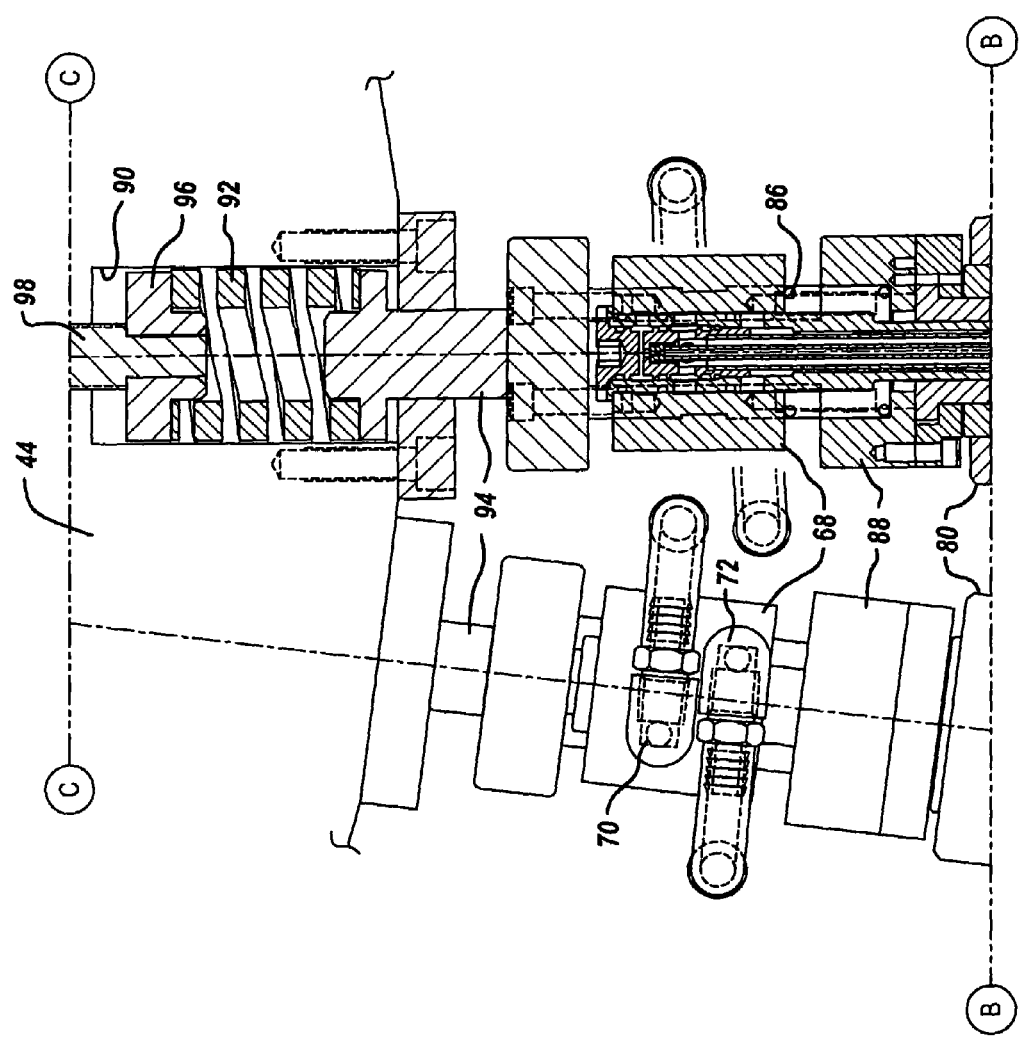

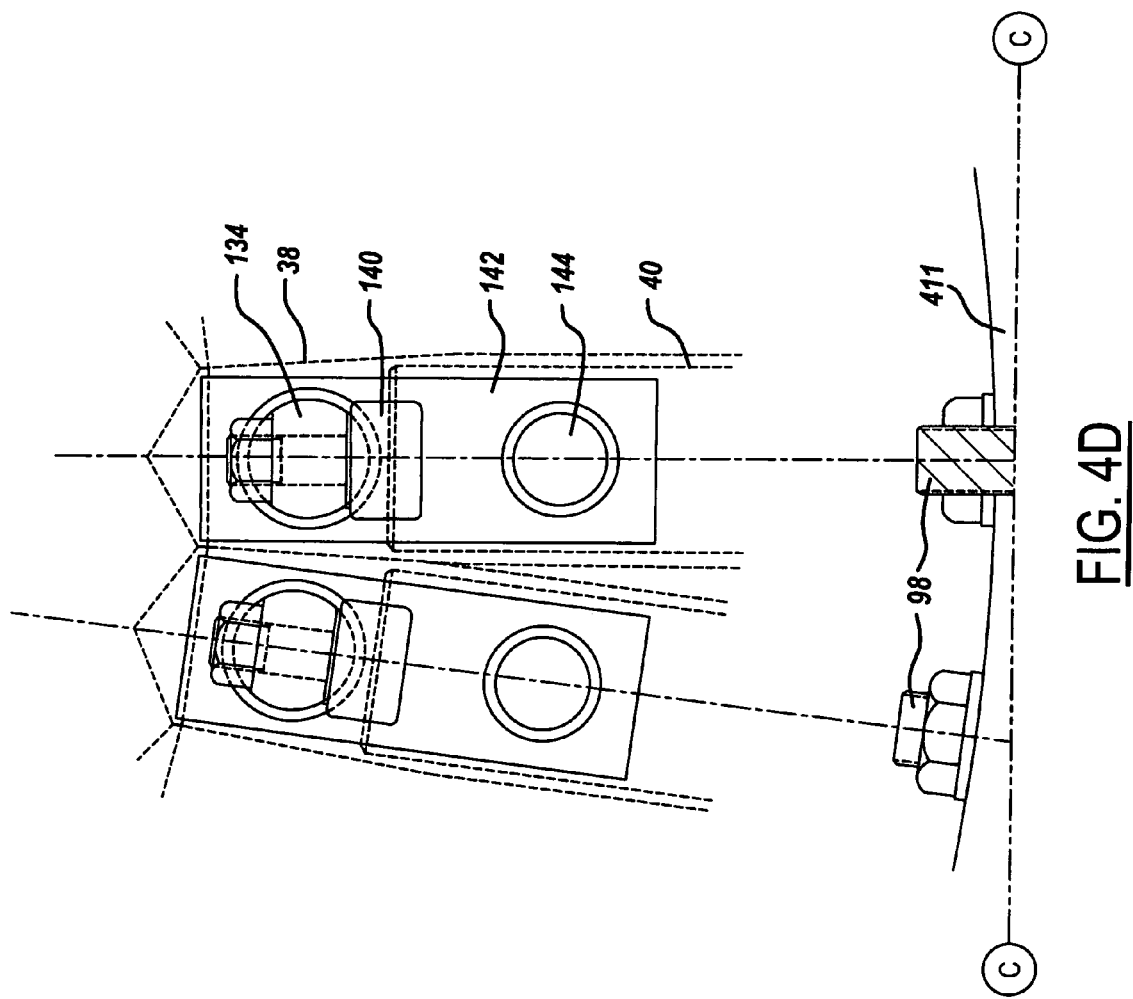

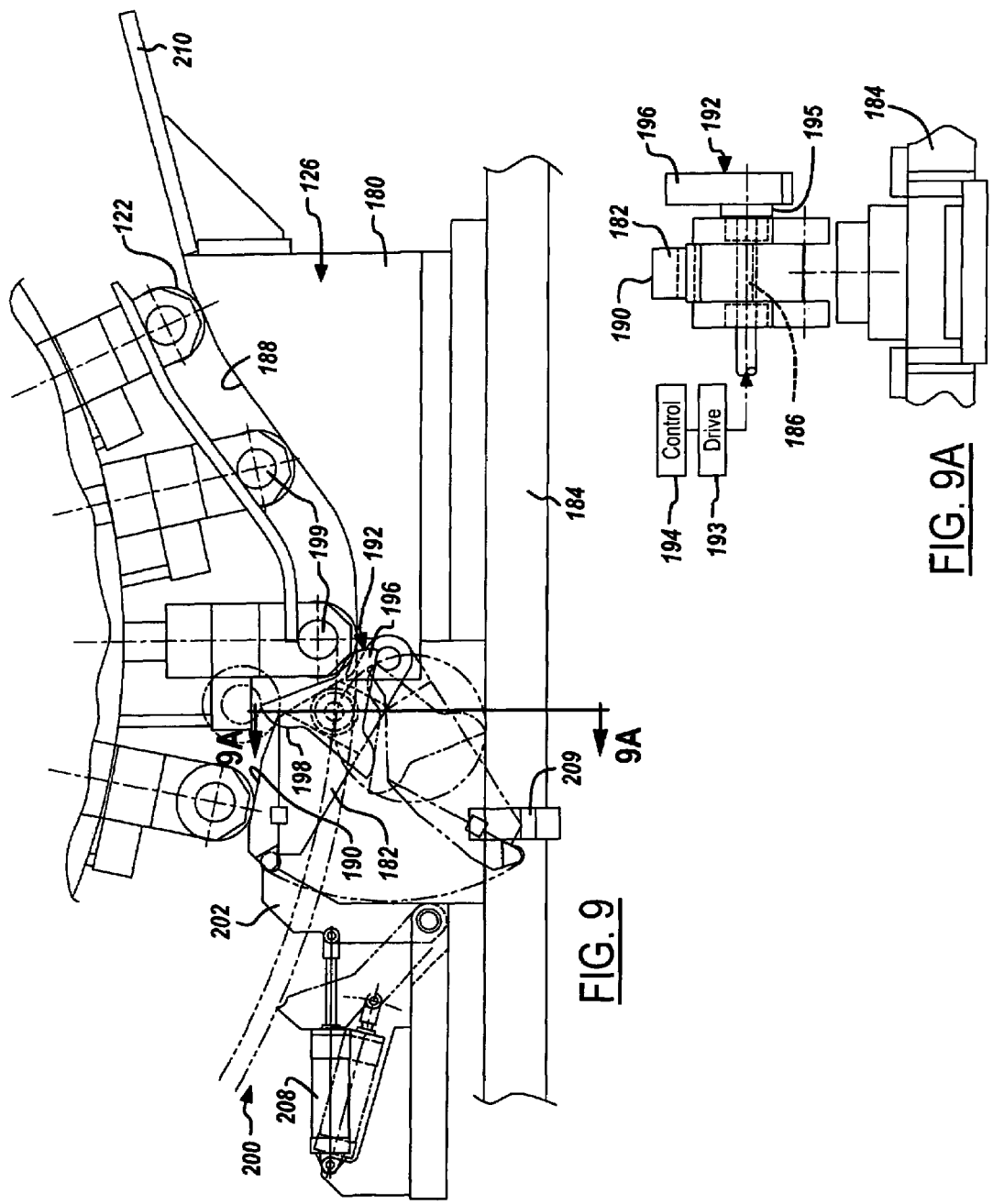

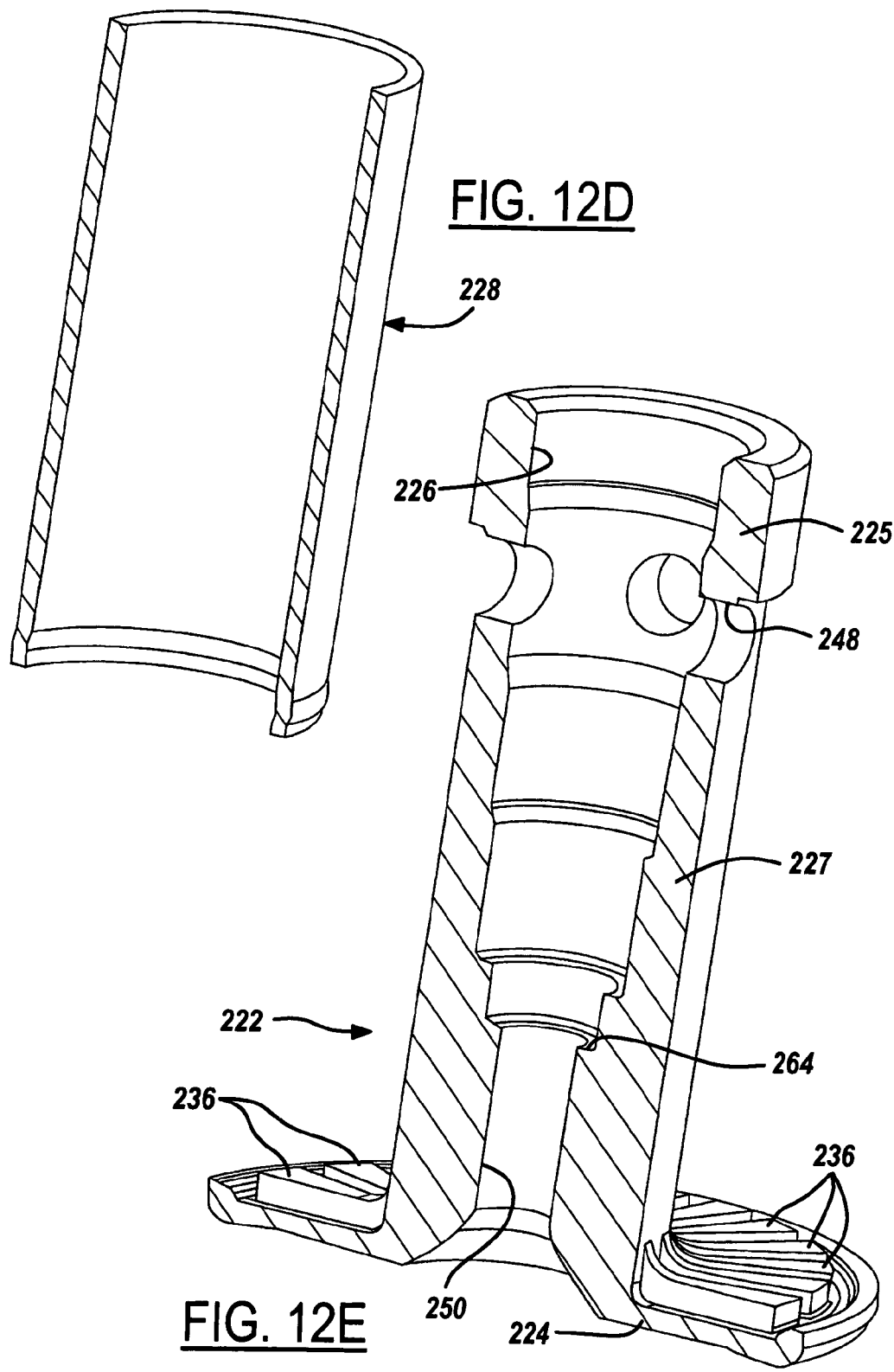

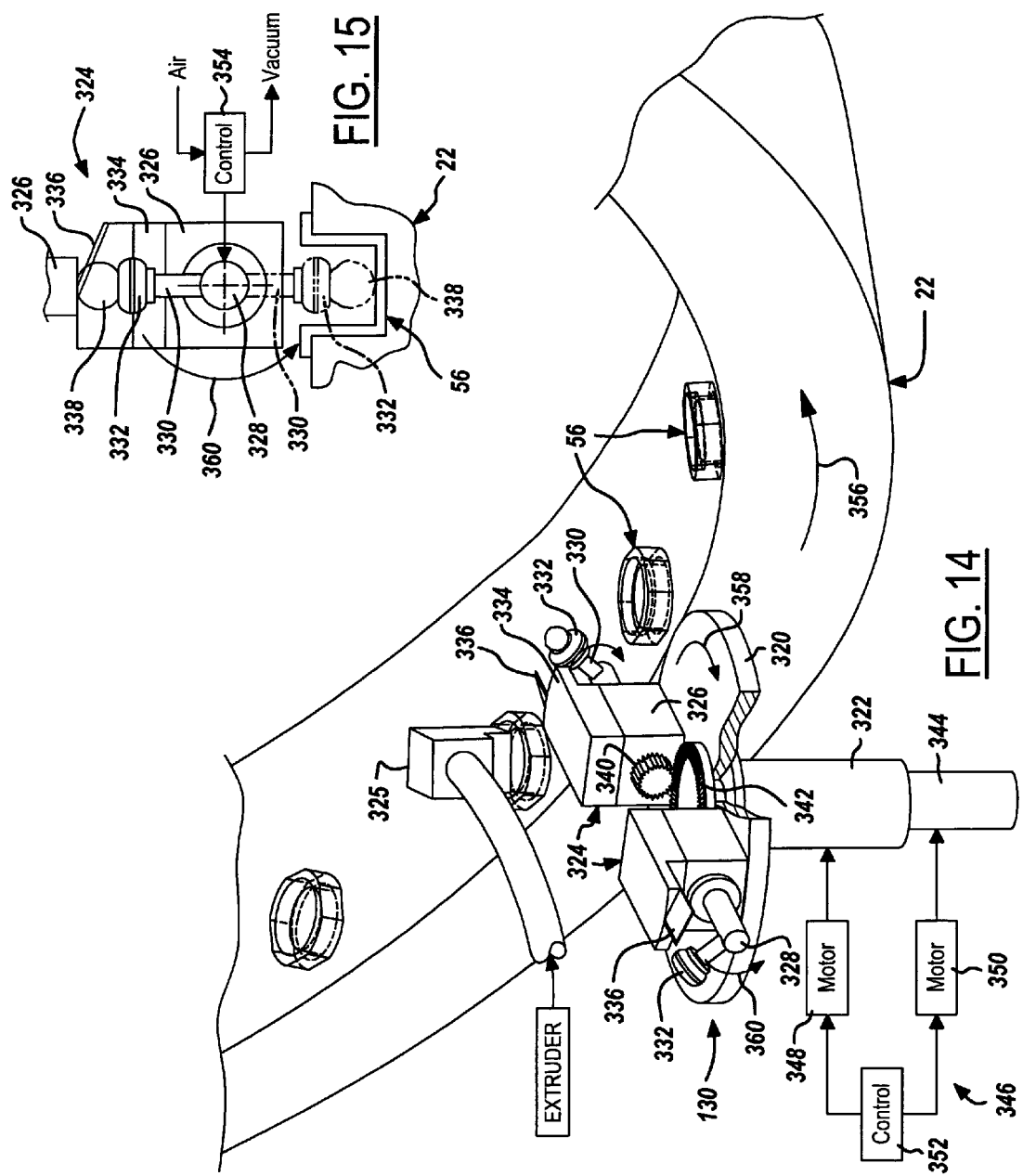

COMPRESSION MOLDING MACHINE

This application is a division of application Ser. No. 11/109,374 filed Apr. 19, 2005 now U.S. Pat. No. 7,331,777.

The present disclosure is directed to a machine for molding plastic articles, such as closure shells or sealing liners within closure shells.

BACKGROUND AND SUMMARY OF THE INVENTIONS

Machines for compression molding closure shells, or compression molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the male mold section and a charge of plastic material is placed in the female mold section, and a closed position in which the male and female mold sections are brought together to compression mold the shell or liner. In a liner machine, premade shells are placed in a nest when the mold sections are open, and a charge or pellet of liner material is placed within the shell before the molds are closed. U.S. patents that illustrate machines of this type for compression molding plastic closure shells include U.S. Pat. Nos. 5,670,100, 5,989,007, 6,074,583 and 6,478,568. U.S. patents that illustrate machines of this type for compression molding sealing liners within closure shells include U.S. Pat. No. 5,451,360.

Although vertical axis carousel-type machines of the noted type have enjoyed substantial commercial acceptance and success, innovation remains desirable. In particular, in vertical axis carousel-type machines, the mold forces and the weight of the rotating equipment are parallel to the vertical axis of rotation, creating a bending moment with respect to the axis of rotation and the bearings and shaft that support the carousel. Carousel-type machines also require a substantial amount of valuable floor space in a manufacturing facility. It is a general object of the present disclosure, in accordance with one aspect of the disclosure, to provide a method and apparatus for compression molding plastic articles, such as plastic closures and plastic liners within closure shells, which reduce the forces applied to the support frame and bearings, reduce maintenance requirements and the amount of energy needed to operate the machine, and/or reduce the amount of floor space required per machine.

The present disclosure involves a number of aspects or inventions, which may be implemented separately from or in combination with each other.

A compression molding machine in accordance with a first aspect of the present disclosure includes a wheel mounted for rotation around a horizontal axis and a plurality of angularly spaced molds disposed around the wheel. Each of the molds includes a first mold segment and a second mold segment disposed radially outwardly of the first mold segment. Each of the second mold segments is movable radially with respect to the associated first mold segment between a radially inner closed position with the first mold segment for compression molding a plastic article, and a radially outer open position spaced from the associated first mold segment for removing a molded article from the mold and placing a mold charge into the mold.

In some preferred embodiments of the disclosure, a cam is disposed adjacent to the wheel for moving the second mold segments radially inwardly and outwardly in sequence as the wheel rotates around its axis. Each of the molds may include an abutment for engagement by the second mold segment as the second mold segment is moved radially outwardly from the associated first mold segment, and a stripper coupled to the abutment for stripping molded parts from the first mold segment. There preferably is lost motion between the second mold segment and the abutment to allow the second mold segment to clear the first mold segment before stripping. In other embodiments of the disclosure, the stripper is operated by a cam independently of motion of the second mold segment. Back-up springs, such as coil or fluid springs, preferably are disposed between the first mold segments and the wheel for absorbing excess compression force applied to the first mold segment. The molds preferably are disposed in angularly spaced circumferential arrays on both sides of the wheel for balancing the forces applied to the wheel and by the wheel to its rotating mechanism. Each of the molds preferably includes a cam-operated latch for releasably locking the second mold segment to the first mold segment in the closed position of the mold segments.

A compression mold for molding plastic closures or plastic liners within plastic closures, in accordance with another aspect of the disclosure, includes at least one male mold segment having a mold core and a stripper sleeve surrounding the mold core. At least one female mold segment is aligned with the male mold segment. The female mold segment is movable with respect to the male mold segment between a closed position to form a mold cavity with the male mold segment, and an open position spaced from the male mold segment for removing a molded article from the cavity and placing a mold charge into the cavity. The stripper sleeve is operatively coupled to the female mold segment to move over the mold core and strip a molded part from the core as the female mold segment is moved away from the male mold segment. The stripper sleeve preferably is coupled to the female mold segment in such a way that there is lost motion between the stripper sleeve and the female mold segment to allow the female mold segment to clear the mold core before initiating motion of the stripper sleeve with respect to the core. The stripper sleeve is movable axially over the mold core in preferred embodiments of the disclosure. However, movement of the female mold segment also could impart rotary motion to the stripper sleeve to unthread a molded closure from the mold core, for example.

A method of compression molding plastic articles, such as plastic closure shells or plastic sealing liners within closure shells, in accordance with yet another aspect of the present disclosure, includes providing a wheel mounted for rotation around a horizontal axis and a plurality of angularly spaced molds around the wheel. Each of the molds includes a first mold segment and a second mold segment disposed radially outwardly of the first mold segment. As the wheel is rotated, each second mold segment in turn is moved radially outwardly with respect to the associated first mold segment and a plastic mold charge is placed between the mold segments. The second mold segment is then moved radially inwardly to a closed position with the first mold segment to compression mold the article. When the second mold segment is thereafter moved radially outwardly from the associated first mold segment, the molded article is removed from the mold prior to placement of a new mold charge between the mold segments.

In one preferred method in accordance with this aspect of the disclosure, the outward motion of the second mold segment is used to remove the molded article from the mold.

BRIEF DESCRIPTION OF THE DRAWINGS

The disclosure, together with additional objects, features, advantages and aspects thereof, will best be understood from the following description, the appended claims and the accompanying drawings, in which:

FIGS. 3A-3D together form a sectional view taken substantially along the line 3-3 in FIG. 2;

FIGS. 4A-4D together form a side elevational view of the apparatus illustrated in FIGS. 3A-3D;

FIG. 9 is a fragmentary front elevational view of a modification to the machine of FIG. 2;

FIG. 9A is a fragmentary sectional view taken substantially along the line 9A-9A in FIG. 9;

FIGS. 12B-12E are sectional views of components in the mold core of FIG. 12;

FIG. 14 is a fragmentary schematic diagram that illustrates an apparatus for placing mold charges into the compression molds in sequence in accordance with another aspect of the disclosure;

FIG. 15 is a schematic diagram that illustrates operation of the apparatus for FIG. 14;

DETAILED DESCRIPTION OF PREFERRED EMBODIMENTS

Figure 1:
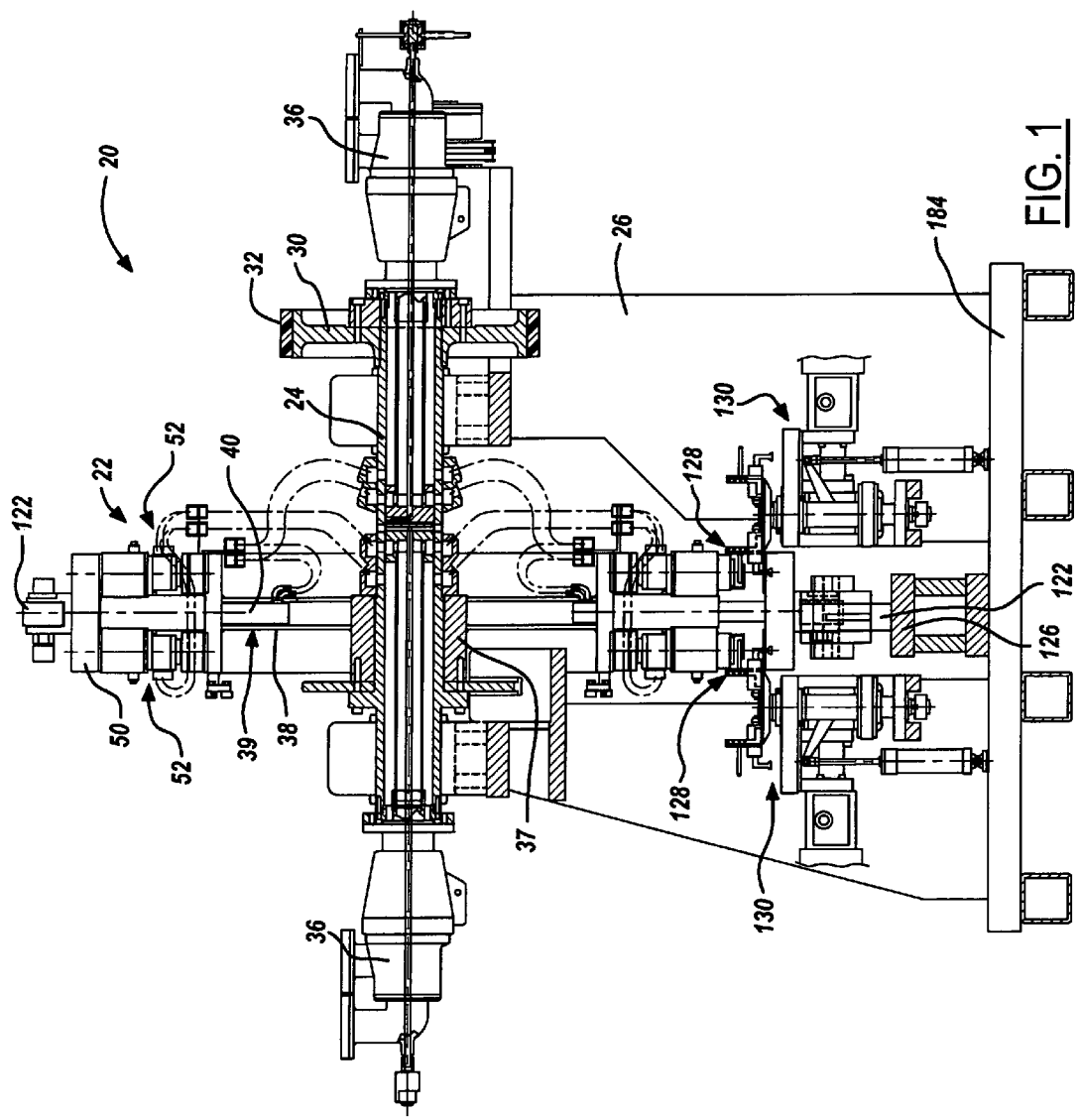
FIG. 1 is a front elevational view of a compression molding machine in accordance with one presently preferred embodiment of the disclosure.
Figure 2:
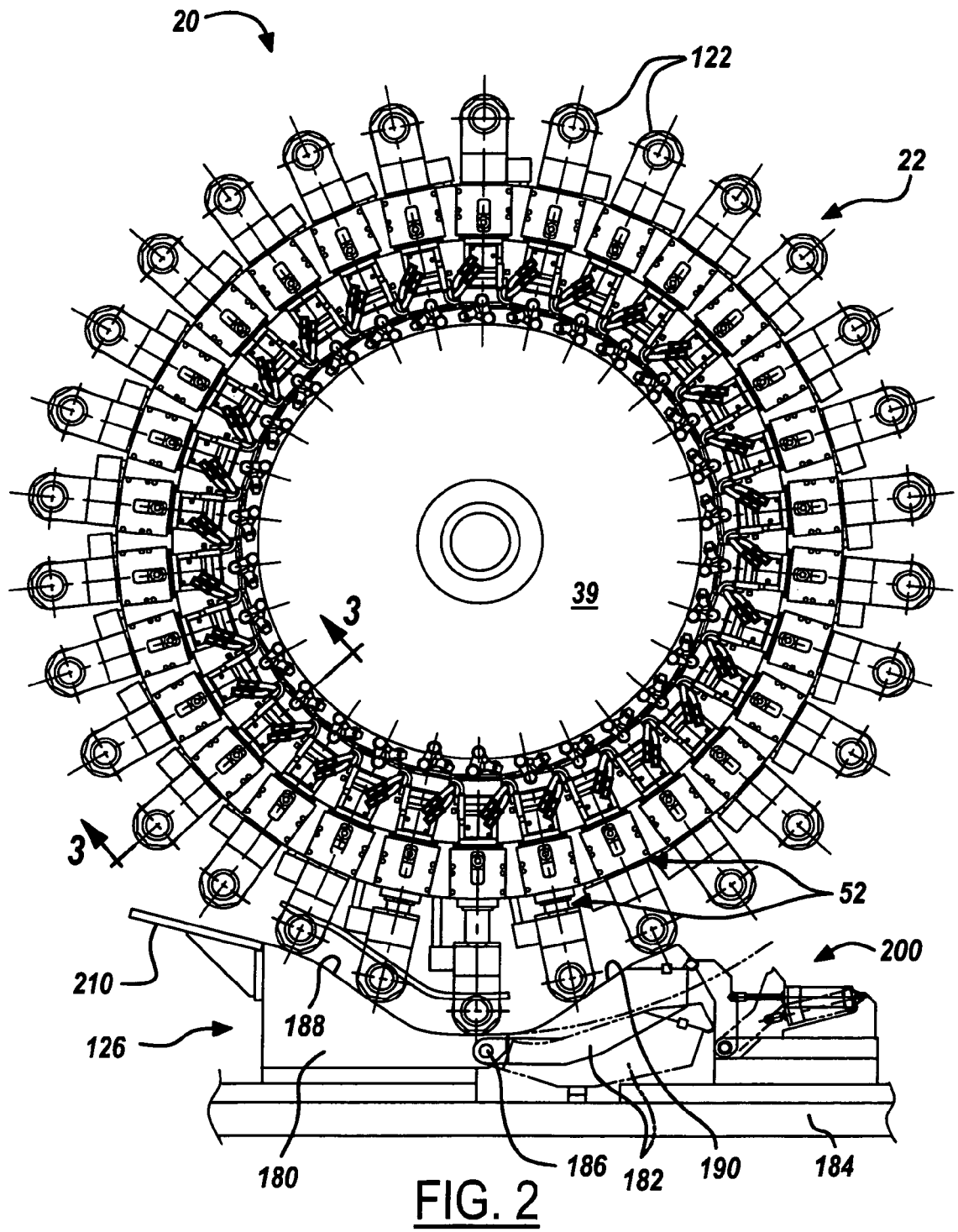
FIG. 2 is a side elevational view of the compression molding machine illustrated in FIG. 1.
Figure 3C:
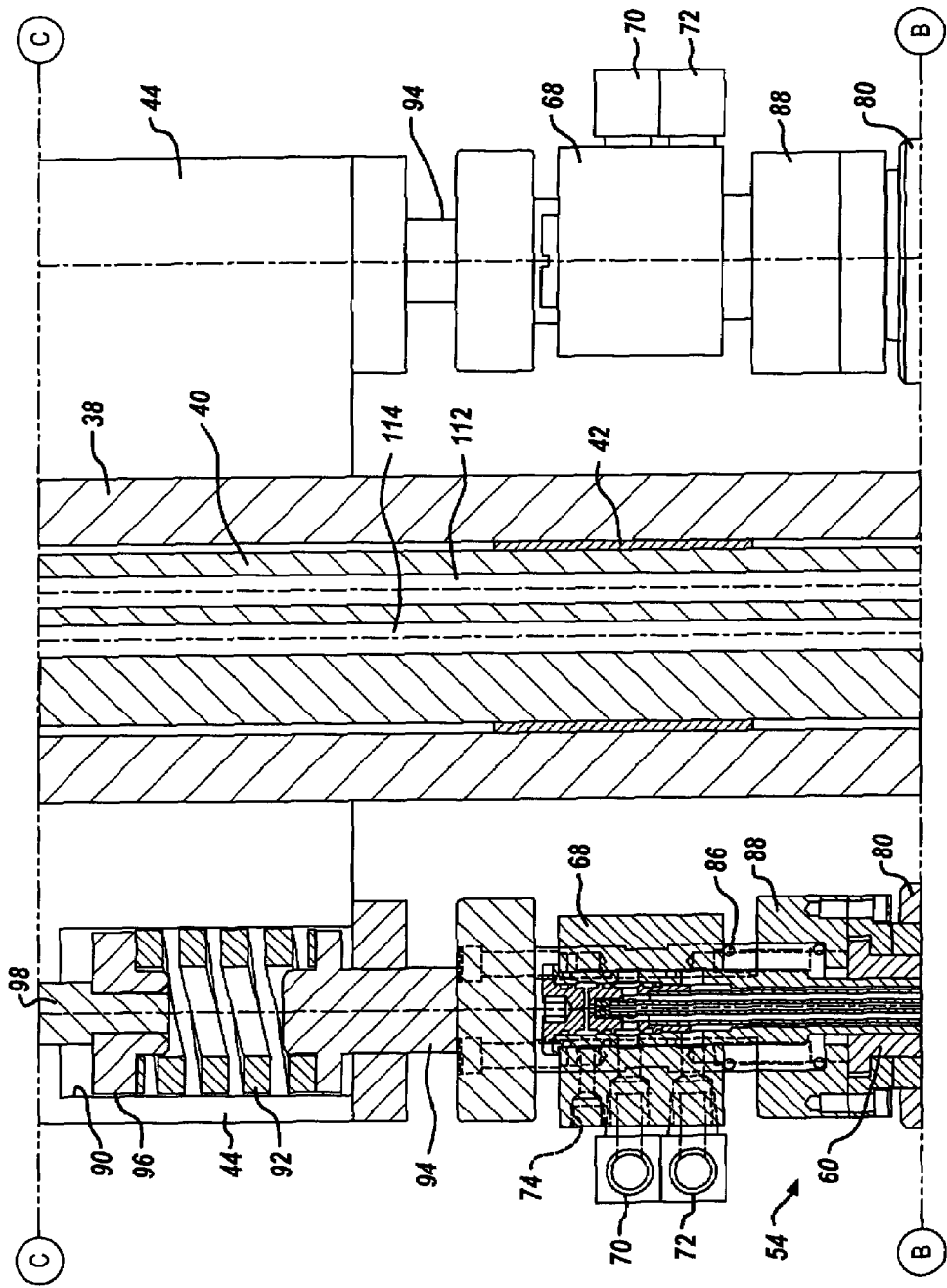

FIGS. 1-2 illustrate one presently preferred embodiment of the disclosure in the form of a machine 20 for compression molding plastic closure shells. Machine 20 includes a wheel 22 mounted on a shaft 24 between spaced supports 26. Shaft 24 is coupled by a pulley 30 and a belt 32 to a motor 36 (FIG. 7) for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced radially extending support spokes 38. Each support spoke 38 is hollow at its outer end. A rod 40 is slidably supported by sleeve bearings 42 (FIGS. 3B-3C) within the hollow outer end of each spoke 38. A crossbar 50 is coupled to the end of each rod 40, so that the combination of rod 40 and bar 50 is generally T-shaped as viewed from the tangential direction in FIG. 1. A pair of radially spaced external supports 44, 46 (FIGS. 3B-3C) are provided on each spoke 38. A plurality of angularly spaced molds 52 are disposed around the periphery of wheel 22, preferably on both sides of the wheel. Each mold 52 is disposed between supports 44, 46 on an associated spoke 38 and an end of crossbar 50 on rod 40. All of the molds 52 preferably are identical.

Figure 4A:
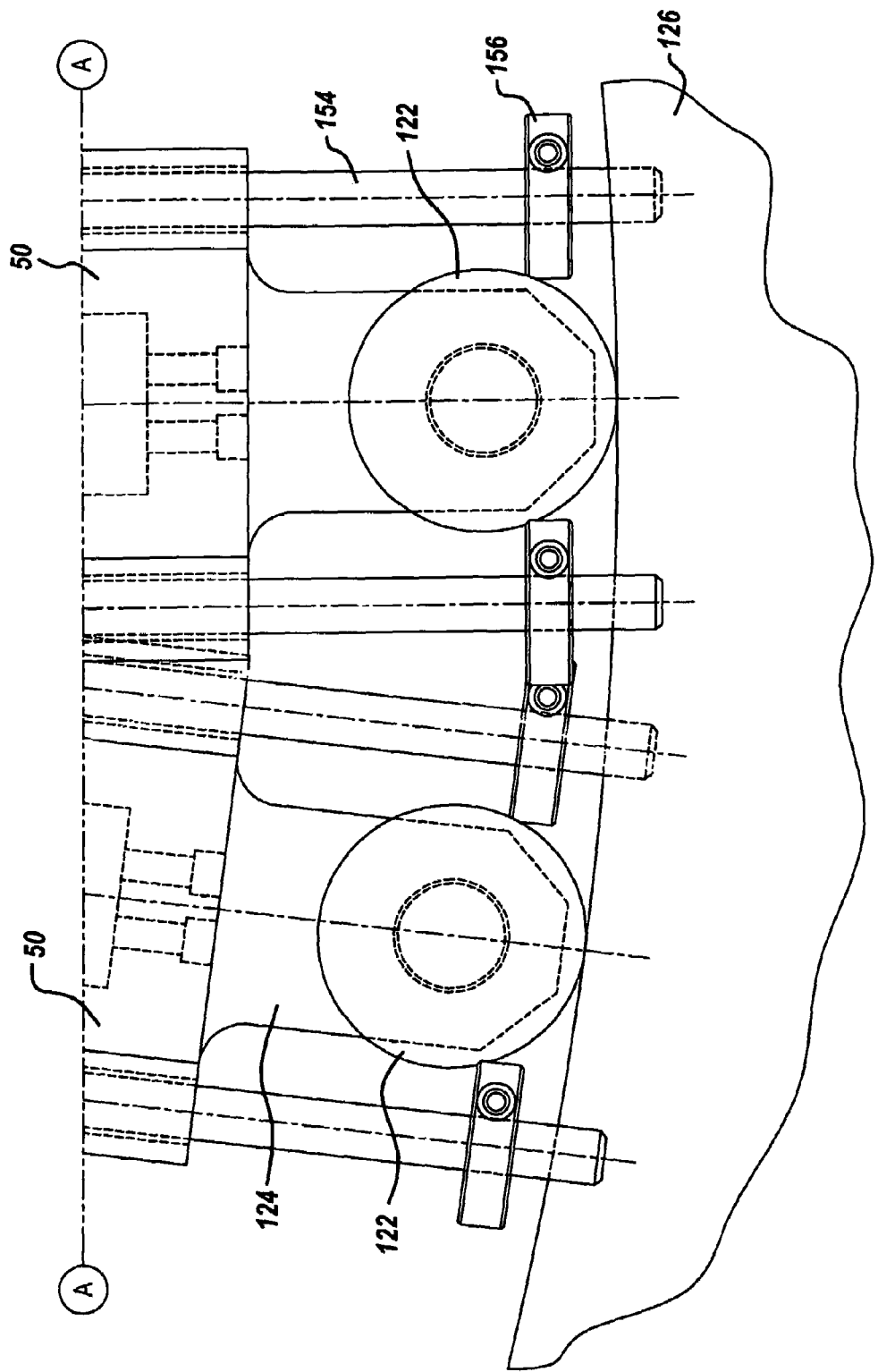
Figure 4B:
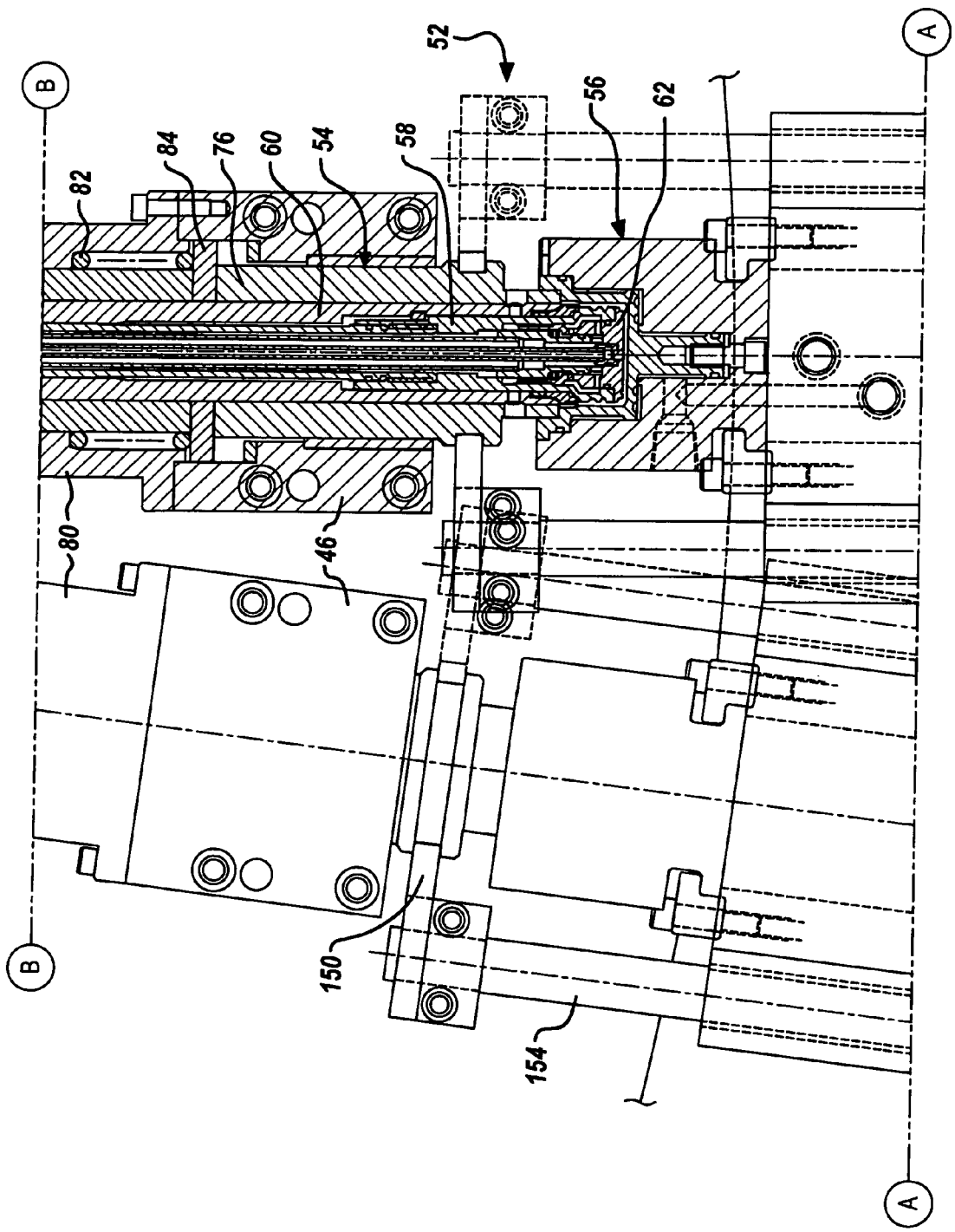
Figure 5:
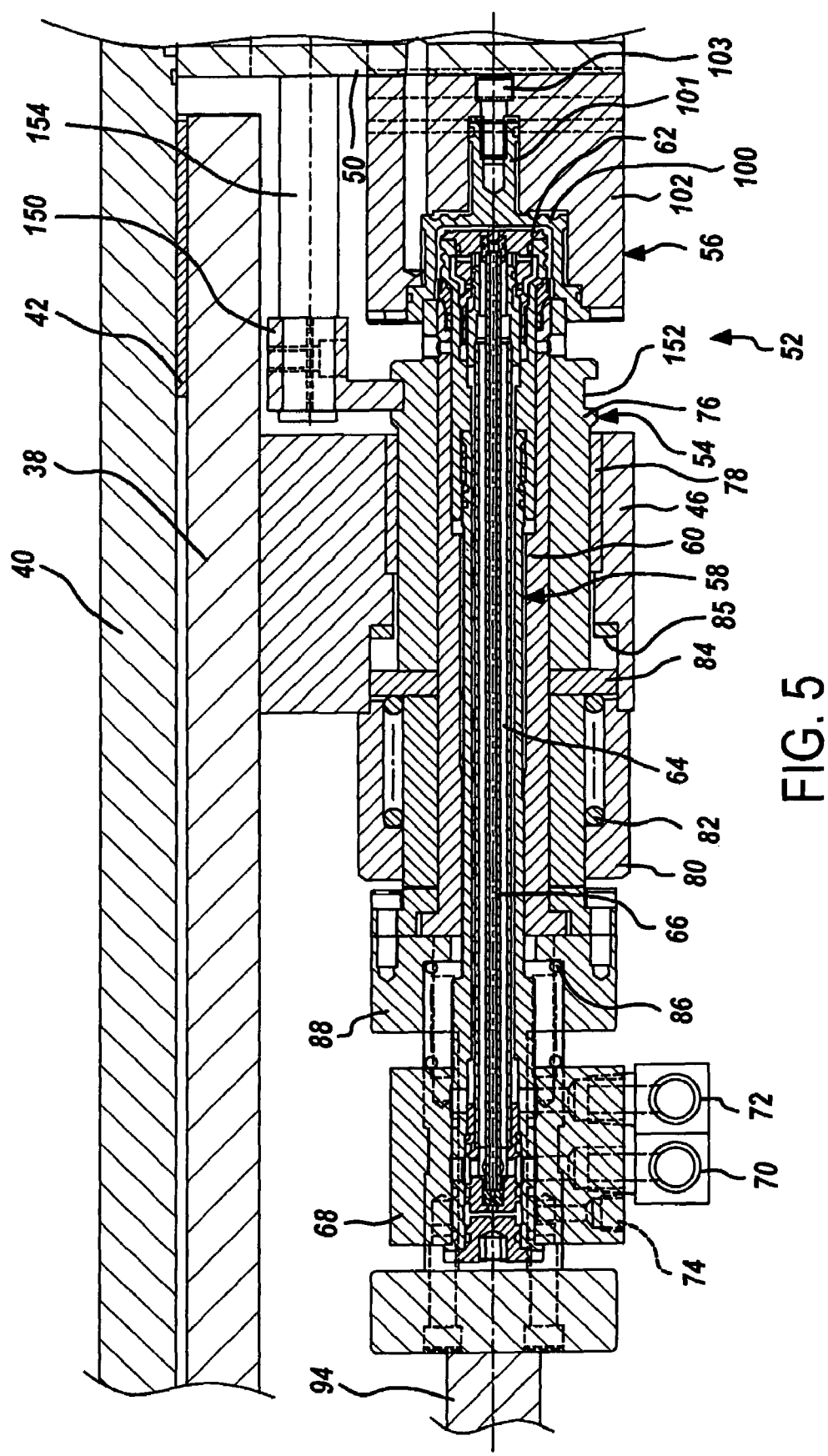
FIG. 5 is an enlarged view of a portion of FIGS. 3B-3C illustrating one of the mold segment pairs.

Each mold 52 includes a radially inner first mold section or segment 54 and a second mold section or segment 56 in radially outward alignment with an associated first mold segment 54 (FIGS. 3B-3C, 4B-4C and 5). In the illustrated embodiments, the radially inner first mold segment 54 is a male mold segment, and the radially outer second mold segment 56 is a female mold segment, although these mold segments could be reversed in accordance with the broadest principles of the disclosure. First or male mold segment 54 includes a mold core 58 slidably mounted within a surrounding sleeve 60 (FIG. 5). Mold core 58 has an end or tip 62 contoured for compression molding the inside surfaces of a closure shell in the embodiment of FIGS. 1-5 (and the embodiment of FIGS. 6A-6B). A first or outer tube 64 extends coaxially through the hollow interior of mold core 58 forming a first annular passage between the exterior surface of tube 64 and the interior surface of core 58. A second tube or other passage 66 extends through the interior of tube 64, preferably coaxially with tube 64 and core 58, forming a second annular passage between the exterior surface of tube 66 and the interior surface of tube 64. The second annular passage between tubes 64, 66 is coupled at a manifold block 68 to a coolant inlet fitting 70. Likewise, the first annular passage between tube 64 and core 58 is coupled at manifold block 68 to a coolant outlet fitting 72. (The "inlet" and "outlet" functions can be reversed.) Thus, coolant can be fed from fitting 70 through the second passage between tubes 64,66 to the tip 62 of core 58, and thence through the first passage between tube 64 and core 58 to outlet fitting 72. An inlet 74 on manifold block 68 is coupled to the interior of tube 66, and can be connected to a source of compressed air for example to assist stripping of closure shells from core tip 62. Manifold block 68 preferably is mounted on the radially inner end of mold core 58—i.e., the end opposite from core tip 62.

A stripper sleeve 76 (FIGS. 3B, 4B and 5) surrounds sleeve 60 and is slidably supported by a bearing 78 within support 46. A cap 80 is secured to support 46, and a coil spring 82 is captured in compression between cap 80 and a washer 84 slidably disposed within support 46 in abutment with the inner end of stripper sleeve 76. Thus, spring 82 biases stripper sleeve 76 toward the second or female mold segment 56 of each mold 52. When the mold is open, washer 84 abuts a surface 85 within support 46 to limit outward movement of stripper sleeve 76 over core 58. A second coil spring 86 (FIGS. 3C, 4C and 5) is captured in compression between manifold block 68 and an abutment 88 coupled to the end of sleeve 60. Thus, core 58 is biased by spring 86 inwardly against sleeve 60. Each support 44 (FIGS. 3C and 4C) has an interior pocket 90 that opens radially outwardly toward and in alignment with the associated first mold segment 54. A coil spring 92 is captured in compression within each pocket 90 and engages an extension 94 coupled to an abutment 88 on sleeve 60. Thus, as pressure to form the closure shell or liner pushes on core 56, core 56 pushes against sleeve 60, which pushes against spring 92 to maintain forming pressure on the melt. (Coil springs 92 can be replaced by fluid springs.) Within pocket 90, spring 92 engages a plate 96 that is coupled to an adjustment screw 98 for individually adjusting the force applied by each spring 92.

Second or female mold segment 56 (FIGS. 3B, 4B and 5) preferably includes a cavity-forming insert 100 having an extension 101 that receives a screw 103 removably to mount the insert on a support block 102. Blocks 102 are removably mounted on crossbar 50 by screws 105 (FIGS. 3B and 4B). Block 102 has coolant passages 106 that communicate in the illustrated embodiment with lateral passages 108,110 in crossbar 50, and thence to longitudinal radial passages 112, 114 in rod 40. As best seen in FIG. 3D, passages 112,114 in rod 40 are connected to fittings 116,118 for circulation of coolant through rod 40, crossbar 50 and block 102 to cool mold cavity inserts 100. It will be noted in FIG. 3D that fittings 116,118 extend through a slot 120 in spoke 38 to permit radial movement of rod 40 with respect to spoke 38.

Figure 2A:
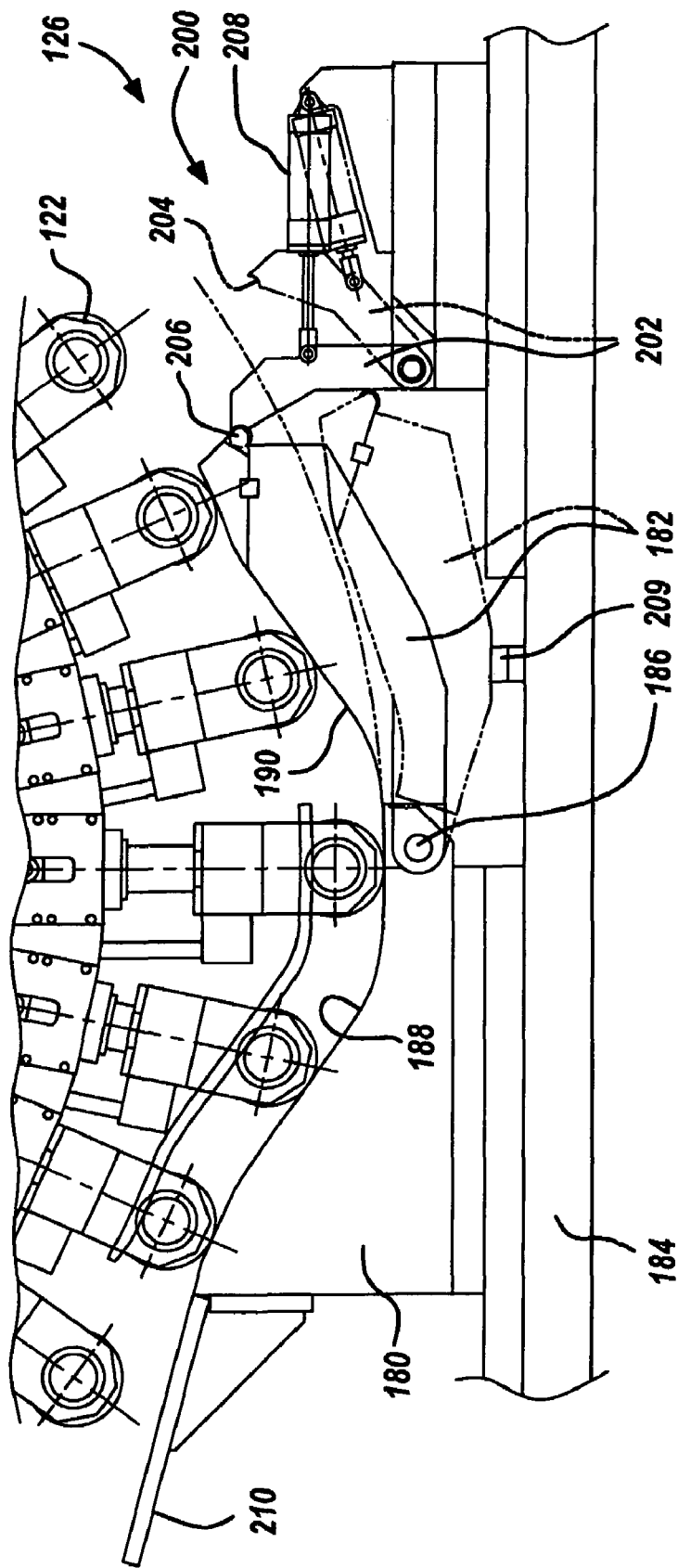
FIG. 2A is an enlargement of a portion of FIG. 2.

A cam follower roller 122 (FIGS. 1, 2, 3A and 4A) is rotatably mounted on a leg 124 that extends radially outwardly from crossbar 50. (Directional words such as "radially," "laterally," "outwardly," "inwardly" and "tangentially" are employed by way of description and not limitation with respect to the horizontal axis of rotation of the wheel.) Leg 124 is offset from the axis of rod 40 on which crossbar 50 is mounted so that cam follower roller 122 is aligned with the axis of rod 40. Each cam follower roller 122 on each crossbar 50 thus is associated, in the illustrated exemplary embodiment, with two molds 52 located on opposite sides of wheel 22. A cam 126 preferably is disposed along the lower arc of the periphery of wheel 22, as best seen in FIGS. 2 and 2A, for engaging cam follower rollers 122 in sequence as wheel 22 rotates around its horizontal axis. During counterclockwise rotation of wheel 22, in the orientation of FIG. 2, follower rollers 122 of each pair of molds 52 in sequence are engaged and captured by cam 126 to pull second mold segments 56 outwardly and downwardly away from first mold segments 54. When each mold in turn is fully open, molded parts or articles are removed from the mold cavities by a suitable part removal mechanism 128 (FIG. 1). A new mold charge is then placed within each mold cavity by a suitable charge placement apparatus 130. As wheel 22 continues rotation, second mold segments 56 in sequence are moved upwardly and inwardly to their closed positions with respect to first mold segments 54 by the counterclockwise end of cam 126, again in the orientation of FIG. 2. Molded article removal mechanism 128 and mold charge placement apparatus 130 may be of any suitable types. For example, mold charge placement apparatus 130 may be a disk-type apparatus of the type illustrated in U.S. Pat. No. 5,603,964. As an alternative, exemplary mold charge placement devices 130 and molded part removal devices are discussed in detail in connection with FIGS. 14-22. Hydraulic, pneumatic or electric actuators could be used on each spoke 38, instead of cam 126, to move the second mold segment radially inwardly or outwardly.

Referring now to FIGS. 1, 3D and 4D, each spoke 38 preferably carries a latch 132 for locking the mold sections to each other in the fully closed position so that there is no need for cam 126 to extend entirely around the periphery of wheel 22. One embodiment of this latch 132 is illustrated in FIGS. 3D and 4D. Each latch 132 includes a slide pin 134 that is slidably mounted in bearings 136 carried by spoke 38. A cam follower roller 138 is carried at the end of slide pin 134 for engagement with a cam 140 (FIG. 3D) disposed in stationary position with respect to wheel 22. A bridge 142 extends radially outwardly from pin 134, and a latch pin 144 is carried by bridge 42. Pin 144 is parallel to pin 134 and extends through an opening 146 in spoke 38 in alignment with a pocket 148 in rod 40. Thus, when cam 140 moves pins 134, 144 into the locked position illustrated in FIG. 3D, latch pin 144 extends into pocket 148 and locks rod 40 with respect to spoke 38. Inasmuch as the second or female mold segments are mounted on rod 40 while the first or male mold segments are mounted on spoke 38, the mold segments thereby are locked in the closed position. The latch preferably remains locked during a major portion of rotation of wheel 22, such as from about the 5:00 position in FIG. 2 counterclockwise to about the 7:00 position, at which point another cam pulls pin 44 out of engagement with pocket 148 so that the second or female mold cavity may be pulled radially outwardly by cam 126 as previously described.

Figure 23:
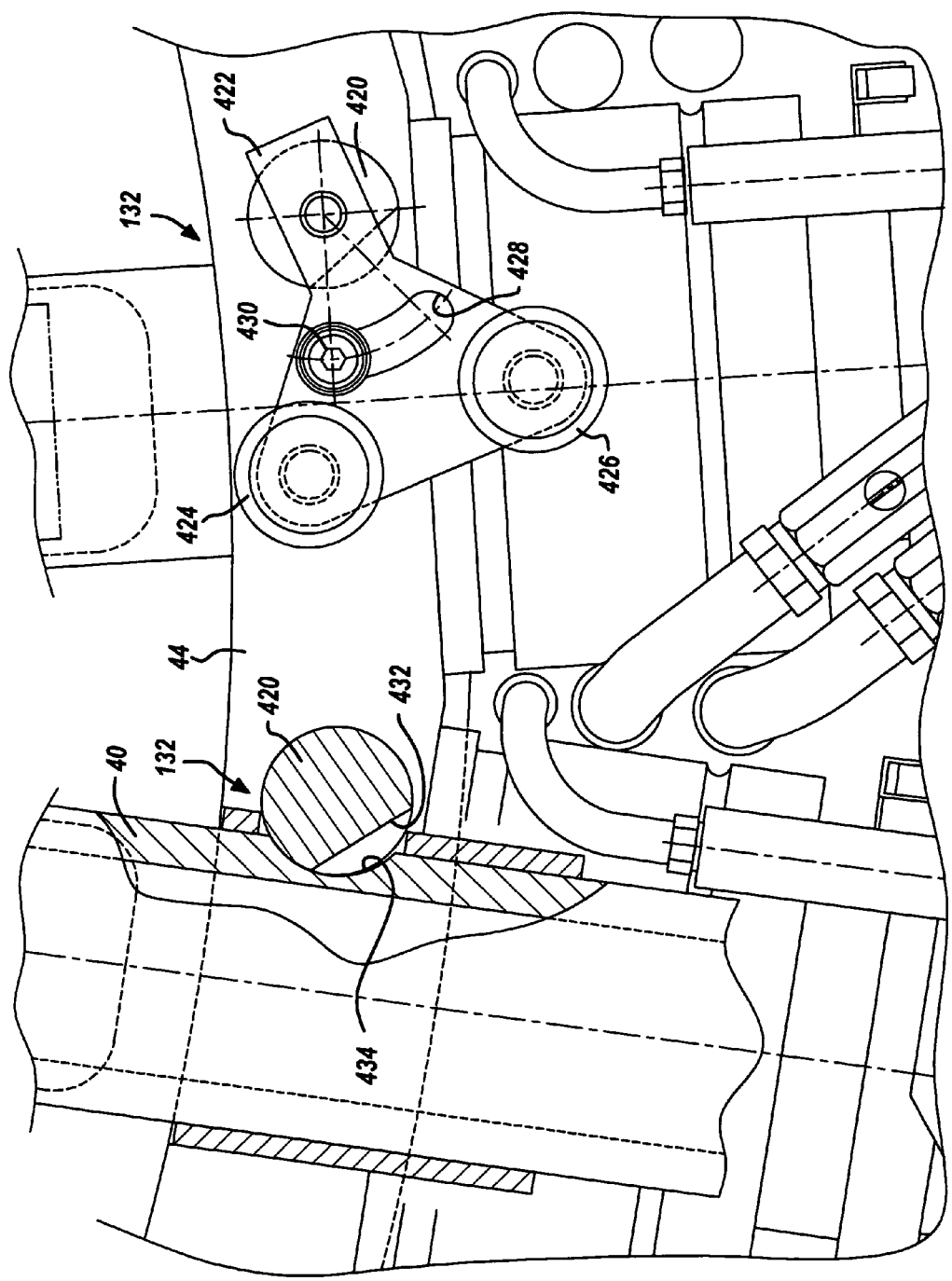
FIG. 23 is a fragmentary elevational view of a modification to the mold lock of FIGS. 3D and 4D.

Another embodiment of the latch 132 is shown in FIGS. 2 and 23. A pin 420 is mounted on support 44 adjacent to each rod 40. Each pin 420 pivots around an axis perpendicular to rod 40, such as parallel to the axis of wheel rotation. An arm 422 is coupled to pivot with each pin 420. A pair of cam rollers 424, 426 are mounted on arm 422 at positions spaced from each other and from pin 420. Arm 422 has a slot 428 that captures a screw 430 secured to support 44. Slot 428 and screw 430 define stops for rotation of pin 420 and arm 422 in both directions. Pin 420 has a flat 432 that selectively registers with rod 40. In the positions illustrated in FIG. 23, and in FIG. 2 counterclockwise from about the 5:30 position to about the 7:00 position, pin 420 is rotated into a pocket 434 on rod 40 to lock rod 40 against movement, and thereby to lock the mold sections to each other. From about the 7:00 position to about the 5:30 position in FIG. 2, pin 420 is pivoted by cam rollers 424,426 so that flat 432 registers with rod 40, so that the rod is free to slide and the mold sections can be opened and closed.

As the second or female mold segment is pulled away from the first or male mold segment, downwardly in the embodiment illustrated in FIGS. 3A-5, this motion of the second or female mold segment strips the molded part from the first or male mold segment in this embodiment. Referring in particular to FIGS. 3A-3B and 4A-4B, a collar 150 is seated in a recess 152 adjacent to the radially outer end of each stripper sleeve 76. A pair of rods 154 extend from each collar 150 through associated slide passages in crossbar 50 and carry associated abutment collars 156 disposed radially outwardly of the crossbar. As second mold segment 56 and crossbar 50 are pulled by cam 126 away from first mold segment 54, crossbar 50 approaches abutment collars 56. When crossbar 50 has been pulled far enough away from first mold segment 54 to abut collars 156, further motion of crossbar 50 pulls stripper sleeve 76 along sleeve 60 and core 58 toward the second mold segment so as to push or strip the molded closure shell from core tip 62. It will be noted in FIGS. 3A and 4A in particular that there preferably is lost motion between crossbar 50 and abutment collars 156 to ensure that second mold segment 56 has cleared core tip 62 before moving stripper sleeve 76 to strip the part from the core trip. Each spring 82 (FIGS. 3B, 4B and 5) biases the associated stripper sleeve 76 toward second mold segment 56 so as to assist stripping of the molded closure shell. In this connection, as second mold segment 56 is closed by cam 126, the open edge of cavity insert 100 preferably engages the opposing end of stripper sleeve 76 and pushes the stripper sleeve against the force of coil spring 82. Abutment collars 156 preferably are adjustably slidably positionable on rods 154 to adjust the amount of lost motion between crossbar 50 and stripper sleeve 76 to a desired level. Crossbar 50, rods 154 and stripper sleeves 76 prevent rotation of rod 40 within spoke 38.

Cam 126 may comprise a single solid cam structure, but preferably includes an over-pressure release as shown in FIGS. 2 and 2A. In the embodiment of FIGS. 2 and 2A, cam 126 includes a first or upstream cam portion 180 (with respect to the direction of wheel rotation). First cam portion 180 preferably is mounted in fixed position on a machine bed 184. A second or downstream cam portion 182 is pivotally mounted by a pin 186 to the downstream end of first cam portion 180. First cam portion 180 has a cam surface 188 that increases in radius with respect to the axis of rotation of wheel 22 for opening the molds in sequence, while second cam portion 182 has a cam surface 190 of decreasing radius with respect to the wheel axis for engagement by rollers 122 to close the molds in sequence.

Second cam portion 182 preferably is held in position by a releasable latch 200, which opens in the event of excessive force on cam portion 182. Latch 200 preferably includes a latch arm 202 pivotally coupled at one end to machine bed 184 and having a second end with a pocket 204 that releasably captures a detent 206, which preferably is disposed at the downstream end of second cam portion 182. Latch arm 202 is biased toward second cam portion 182 by a spring 208, which may comprise a fluid spring (e.g., air or oil), as shown or a suitable mechanical spring. Thus, in the event of excess force on cam portion 182, such as in the event excess plastic in the mold cavity, detent 206 moves out of pocket 204 and moves to the position shown in phantom against a stop 209. Wheel 22 continues to rotate with the mold segments open. An extension 210 on cam portion 180 captures the open mold segments upon continued rotation of wheel 22.

FIGS. 6A-22 illustrate various modifications or elaborations on the embodiment of FIGS. 1-5. Reference numerals in FIGS. 6A-22 that are identical to those in FIGS. 1-5 indicate correspondingly identical or related components.

Figure 6A:
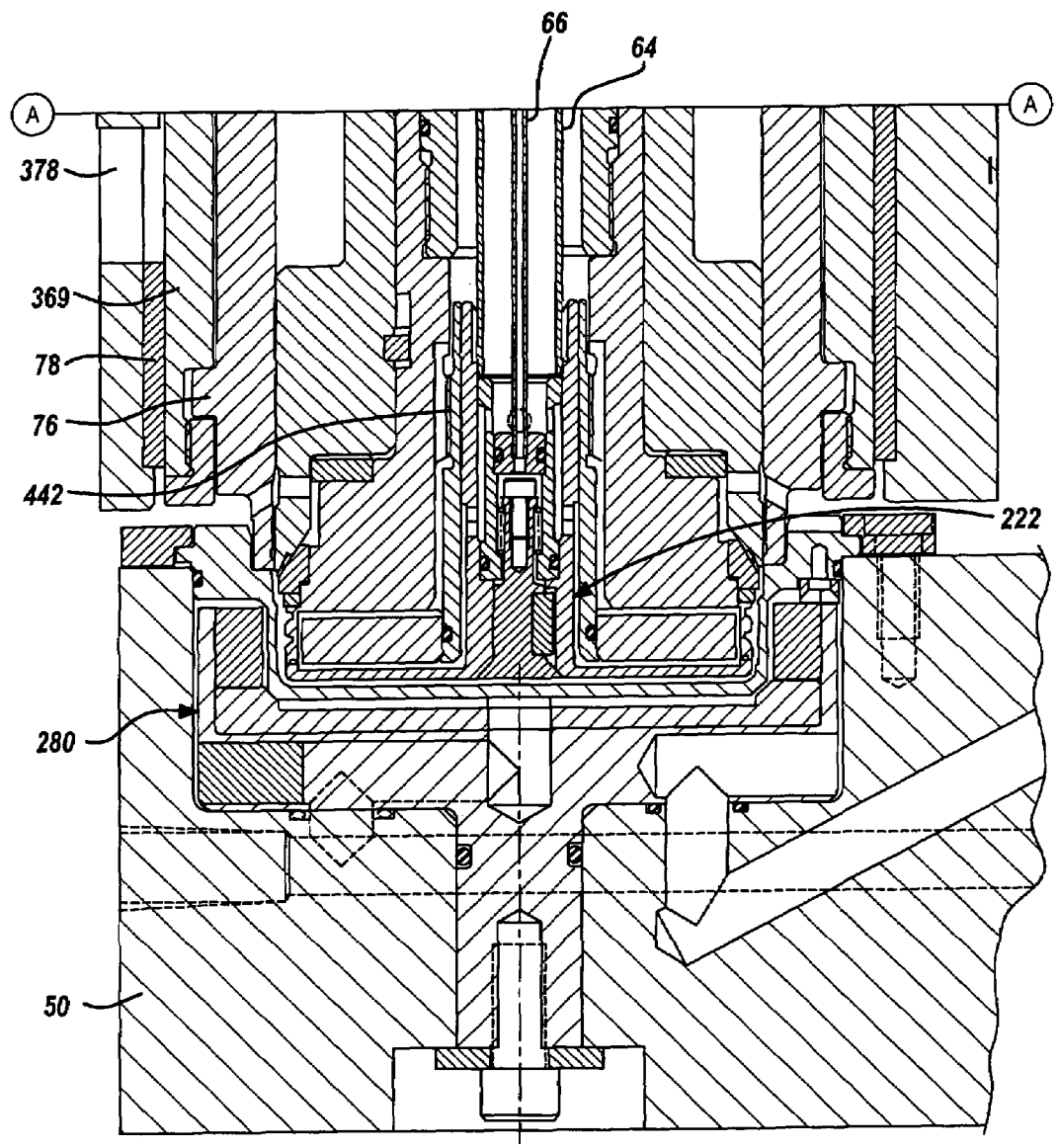
FIGS. 6A and 6B together form a sectional view of a modification to FIGS. 3A-3D.
Figure 6B:
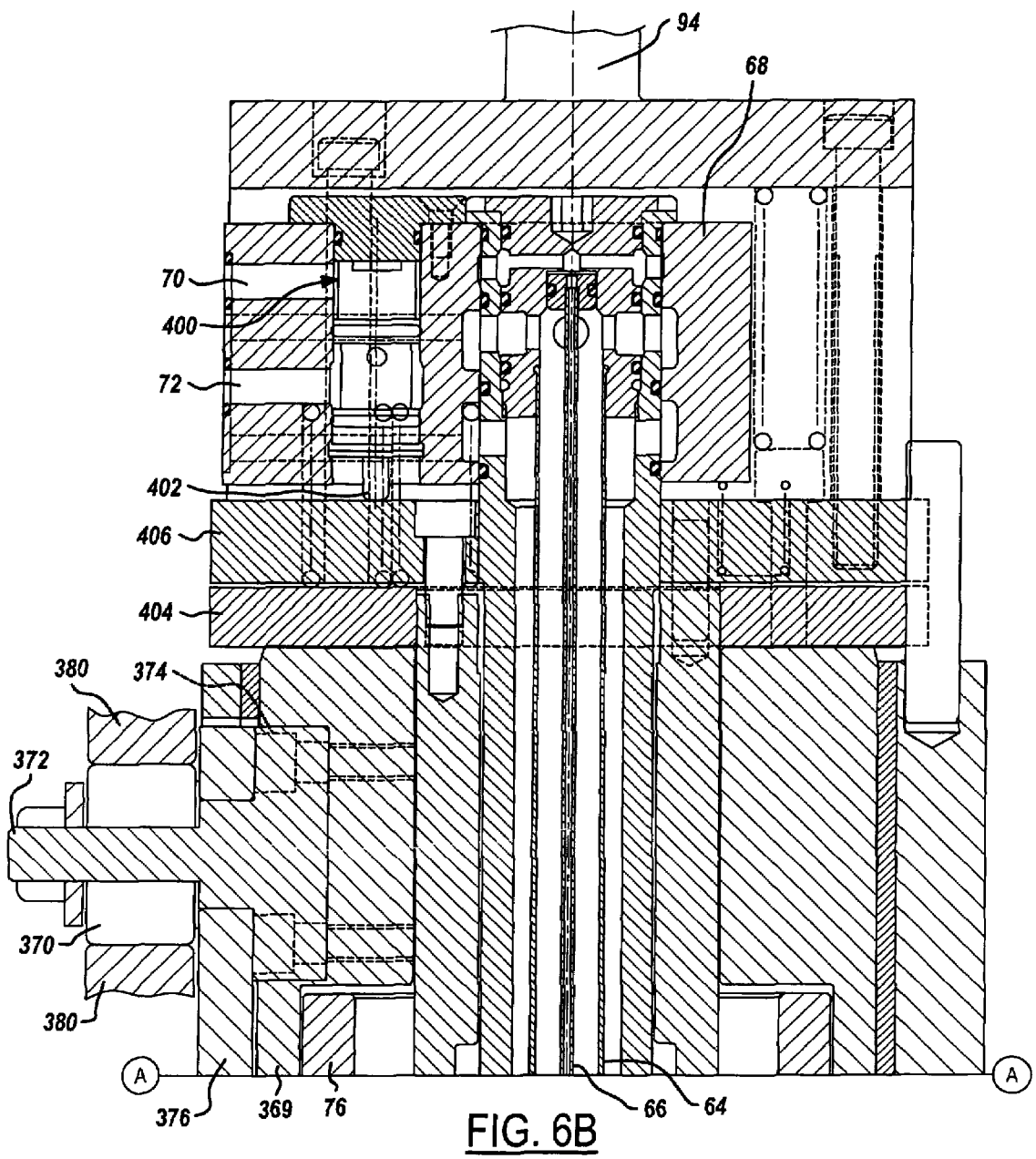

FIGS. 6A-6B illustrate a modification to the male and female mold tool stack of FIGS. 3A-5. First or male mold segment 54 includes a mold core 220 that will be described in detail in connection with FIGS. 12-12E. Mold core 220 is surrounded by sleeve 60, which in turn is surrounded by stripper sleeve 76. Stripper sleeve 76 is mounted within support 46 by a stripper sleeve body 369 and bearings 78. A cam roller 370 is rotatably mounted on a shaft 372 that is secured to stripper sleeve body 369 by screws 374. A stripping stop 376 surrounds shaft 372 and is slidable in a slot 378 on support 46. During rotation of wheel 22 (FIGS. 1-2), when the mold segments are open, cam roller 370 engages a cam 380 adjacent to the wheel to move stripper sleeve radially outwardly (downwardly in FIGS. 6A-6B) to strip the molded closure shell off of mold core 220. Thus, in this embodiment, the stripper sleeve is activated by a separate cam 380 rather than by motion of second or female mold segment 56 as in the prior embodiment. Female mold segment 56, including mold cavity 280, is described in connection with FIGS. 13A and 13B. A spool valve 400 (FIG. 6B) is carried by manifold 68 and has an actuator pin 402 coupled to a stripper plate 404 through a spring retainer 406 to feed air under pressure through tube 66 as stripper sleeve 76 is actuated to assist stripping of the closure shell.

Figure 7:
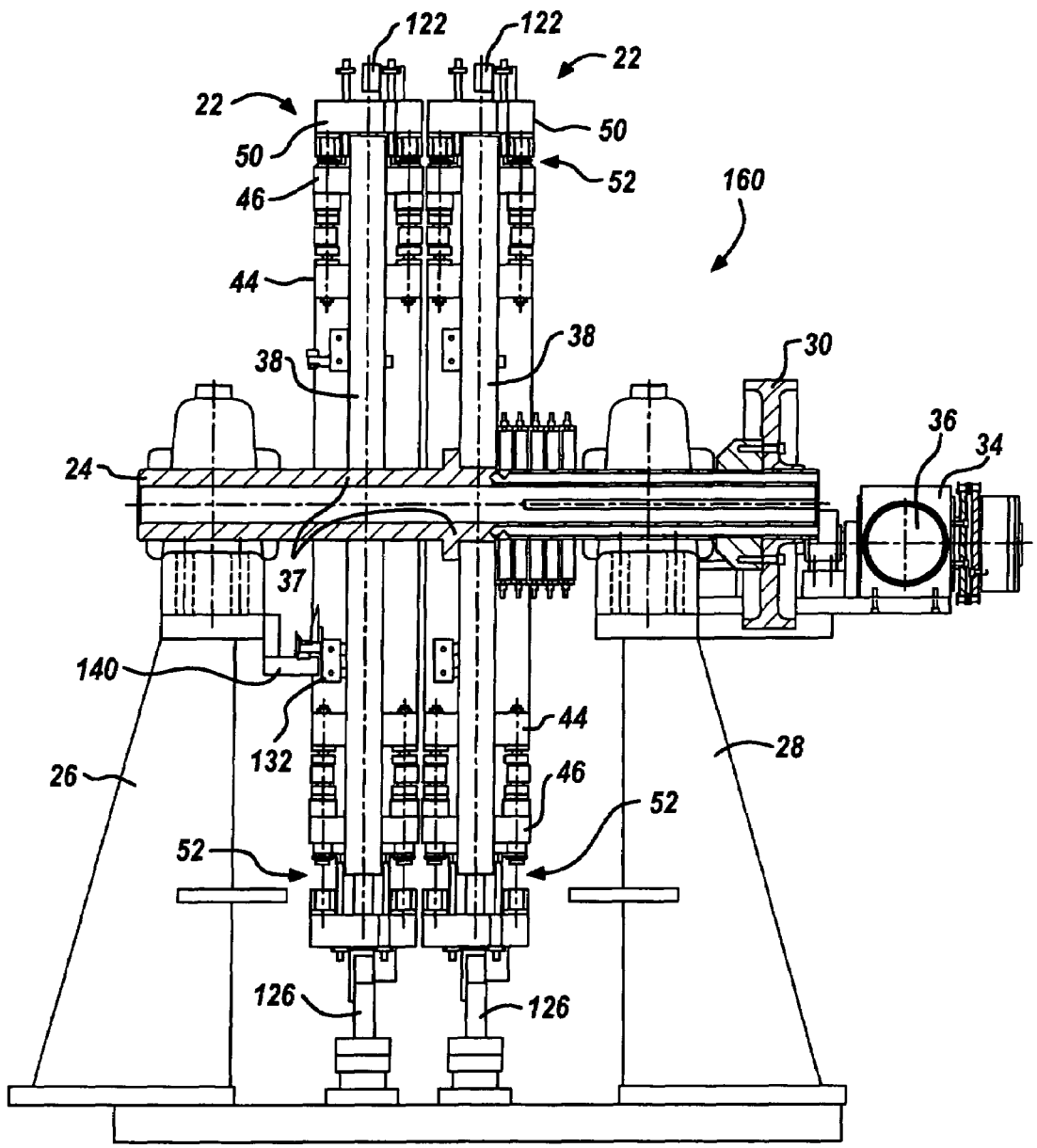
FIG. 7 is a front elevational view, which is similar to that of FIG. 1 but illustrates a modified embodiment of the disclosure.

FIG. 7 illustrates a machine 160 in accordance with a modified embodiment of the disclosure, in which there are two wheels 22 mounted for rotation on a single shaft 24 driven by a single motor 36. Each wheel 22 is as previously described in conjunction with FIGS. 1-5 or FIGS. 6A-6B.

Figure 8:
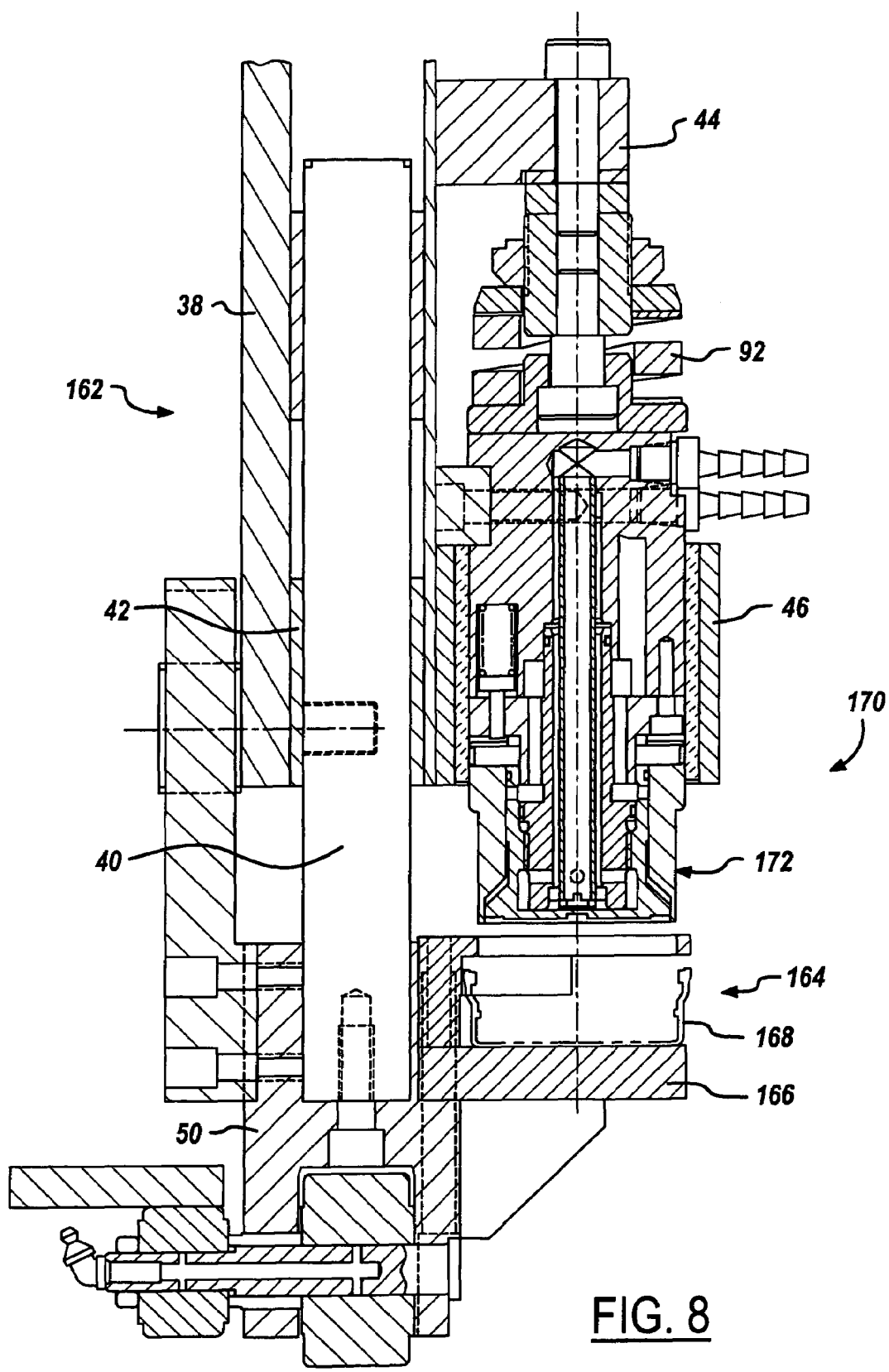
FIG. 8 is a partially sectioned elevational view of a modification to the disclosure for molding sealing liners within closure shells.

FIG. 8 illustrates an exemplary implementation of the present disclosure in a machine 162 for compression molding liners within preformed plastic closure shells. In this machine, the radially outer second mold section 164 includes a nest 166 for receiving premade plastic closure shells 168 by means of a suitable shell placement mechanism. Inner first mold segment 170 includes a core 172 having an end contoured to achieve the desired contour of the sealing liner molded within shell 168. Other components in FIG. 7 that are analogous to components previously discussed in connection with FIGS. 1-5 have correspondingly identical reference numerals.

Figure 10A:
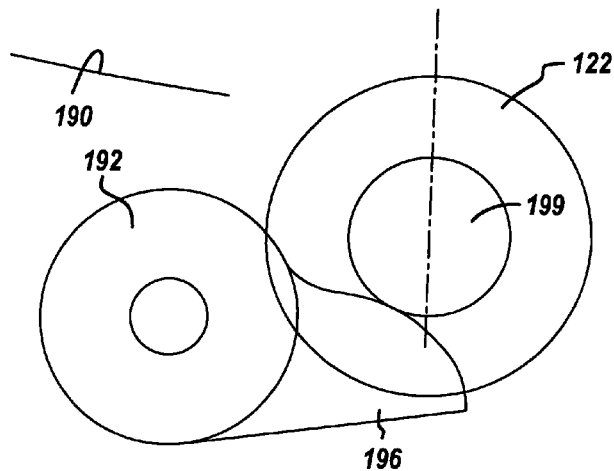
FIGS. 10A-10C are schematic diagrams that illustrate sequential stages of operation of the embodiments of FIGS. 9-9A.
Figure 10B:
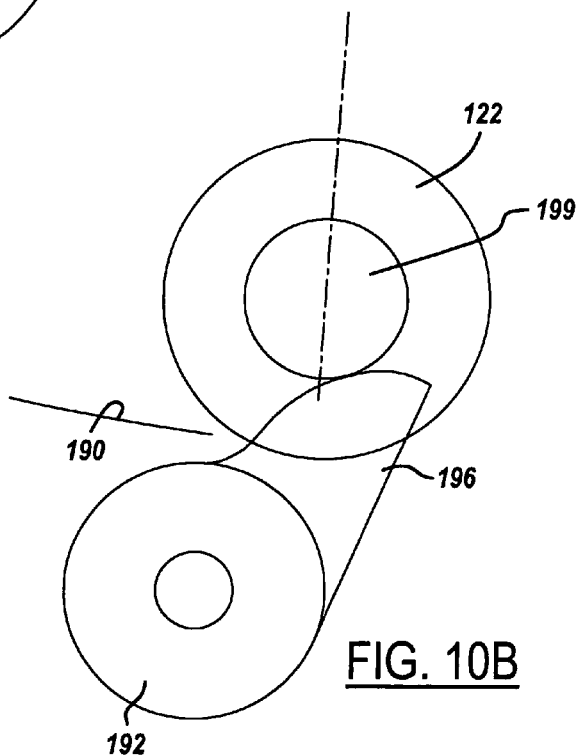
Figure 10C:
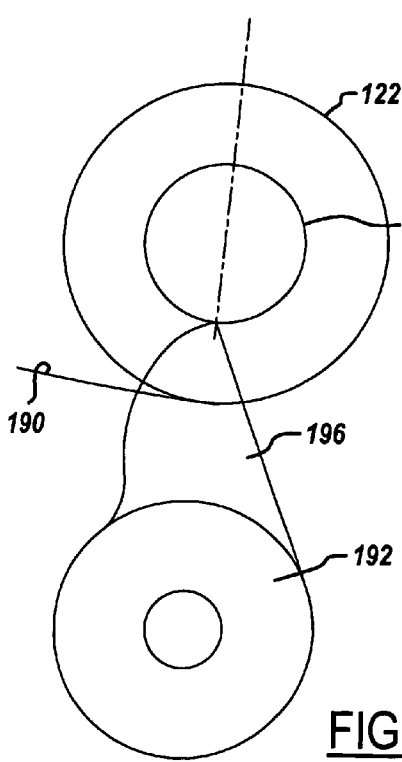

FIGS. 9-10C illustrate a modification to the mold opening/closing cam 126 illustrated in FIG. 2. In the embodiment of FIGS. 9-10C, a cam displacement wheel 192 is provided affirmatively to move or lift mold section roller 122 from cam portion 180 onto a foreshortened second cam portion 182 and thereby reduce the angular rotation of the wheel needed to close the mold sections. Cam displacement wheel 192 preferably is rotatably mounted on cam portion 182 and is coupled to a drive 193 coupled to a control 194. Drive 193 may comprise a servomotor, for example, coupled to a servomotor control 194. Alternatively, drive 193 may be a cam drive coupled to wheel drive motor 36 (FIG. 1). Cam displacement wheel 192 thus is rotated in synchronism with rotation of wheel 22 to lift or displace cam rollers 122 in sequence from cam portion 180 to cam portion 182. Wheels 22, 192 preferably rotate at constant velocity in synchronism with each other. Drive 193 preferably is coupled through pivot 186. A gear drive 195 (FIG. 9A) couples pivot 186 to wheel 192 to rotate the wheel, preferably at constant velocity. Wheel 192 is rotatably mounted on movable cam portion 182. Cam displacement wheel 192 reduces the load on the guide bearings on wheel 22, as well as the angular wheel displacement required to close the molds.

In the embodiment of FIGS. 9-10C, cam displacement wheel 192 has three angularly spaced radially extending arms 196. The leading edge 198 of each arm 196 (with respect to its counterclockwise direction of rotation of wheel 192 in FIGS. 9 and 10A-C) has a rounded contour to engage and lift a roller 199 cantilevered coaxially with cam roller 122 on each mold section 56. (FIGS. 10A-10C show only one cam arm 196 for simplicity.) FIG. 10A illustrates initial engagement or contact of a cam arm 196 with a roller 199. As arm 196 rotates (counterclockwise in FIGS. 10A-10C), roller 199 moves from the mid portion of edge 196 in FIG. 10A through the position of FIG. 10B toward the position of FIG. 10C. In FIG. 10C, roller 199 rests on the tip of arm 196 and roller 122 is placed on the surface 190 of cam portion 182. Edges 198 in sequence thus are profiled to impart inward motion to mold segments 56 ("inward" with respect to the axis of mold wheel rotation) without generating detrimental dynamic forces on cam portion 182. In one presently preferred implementation, cam displacement wheel 192 reduces the time required for displacing mold segments 52, in units of degrees of rotation of wheel 22, by a factor of 60%.

Figure 11:
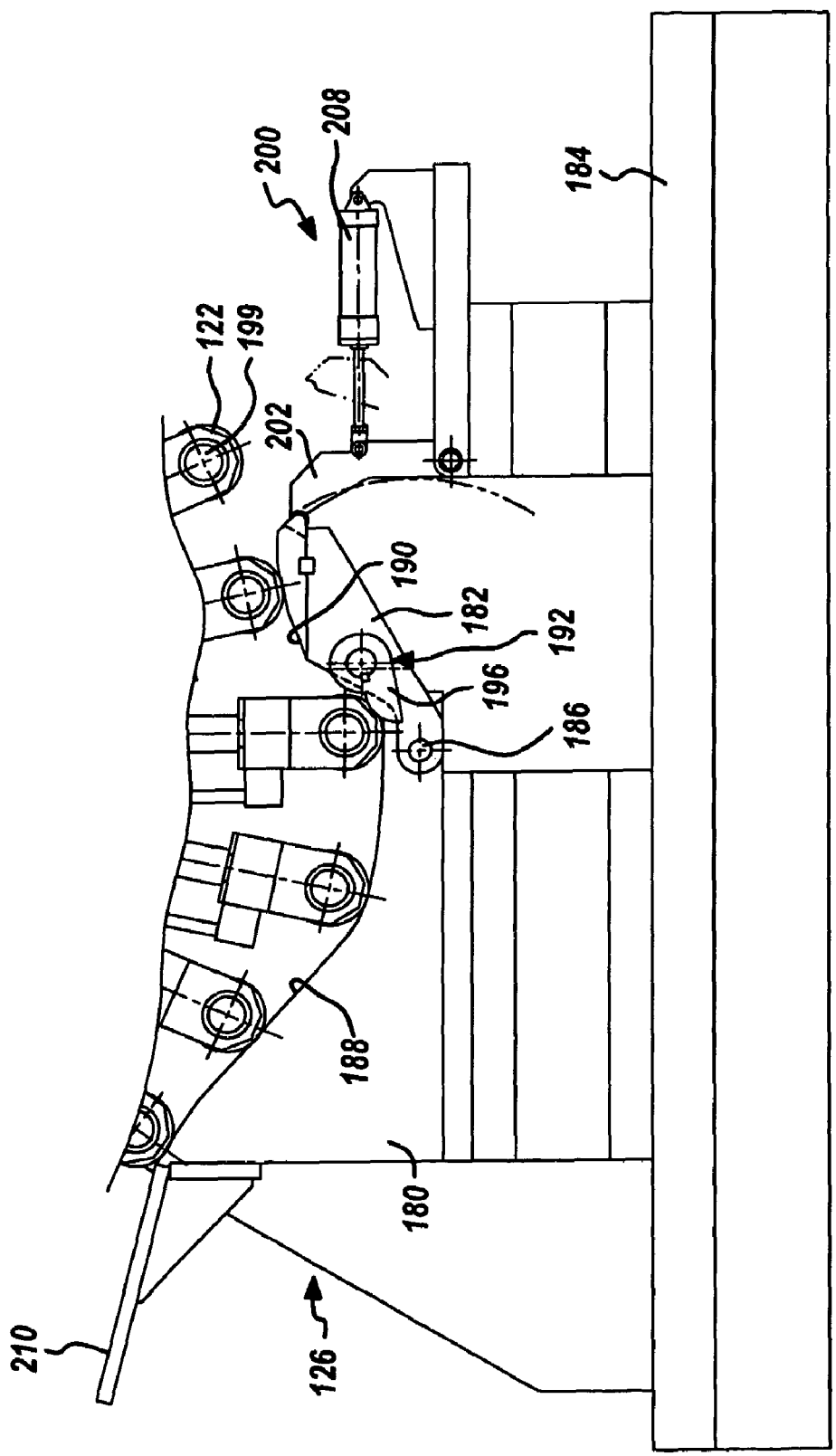
FIG. 11 is a fragmentary front elevational view of a modification of the embodiment of FIG. 9.

FIG. 11 illustrates a modification to the embodiment of FIG. 9, in which cam displacement wheel 192 has a single arm 196. The number of arms needed on the cam displacement wheel depends upon the speed of rotation of wheel 22 and the load placed on wheel 192 by the cam sections in sequence.

Figures 12, 12A:
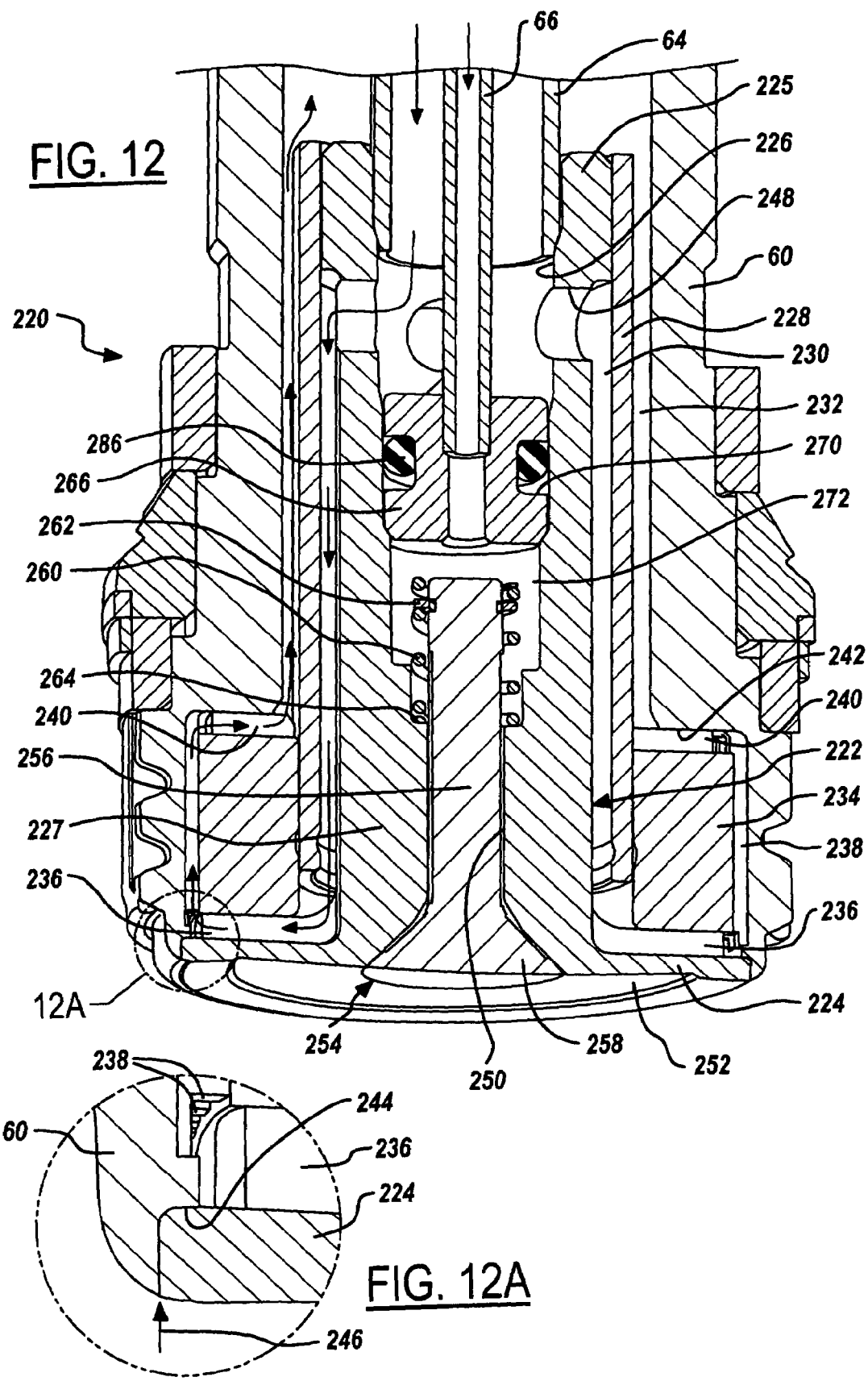
FIG. 12 is a fragmentary sectional view on an enlarged scale of a modification to the mold core in the embodiment of FIGS. 6A-6B.
FIG. 12A is an enlarged view of the portion of FIG. 10 within the area 12A.
Figure 12B:
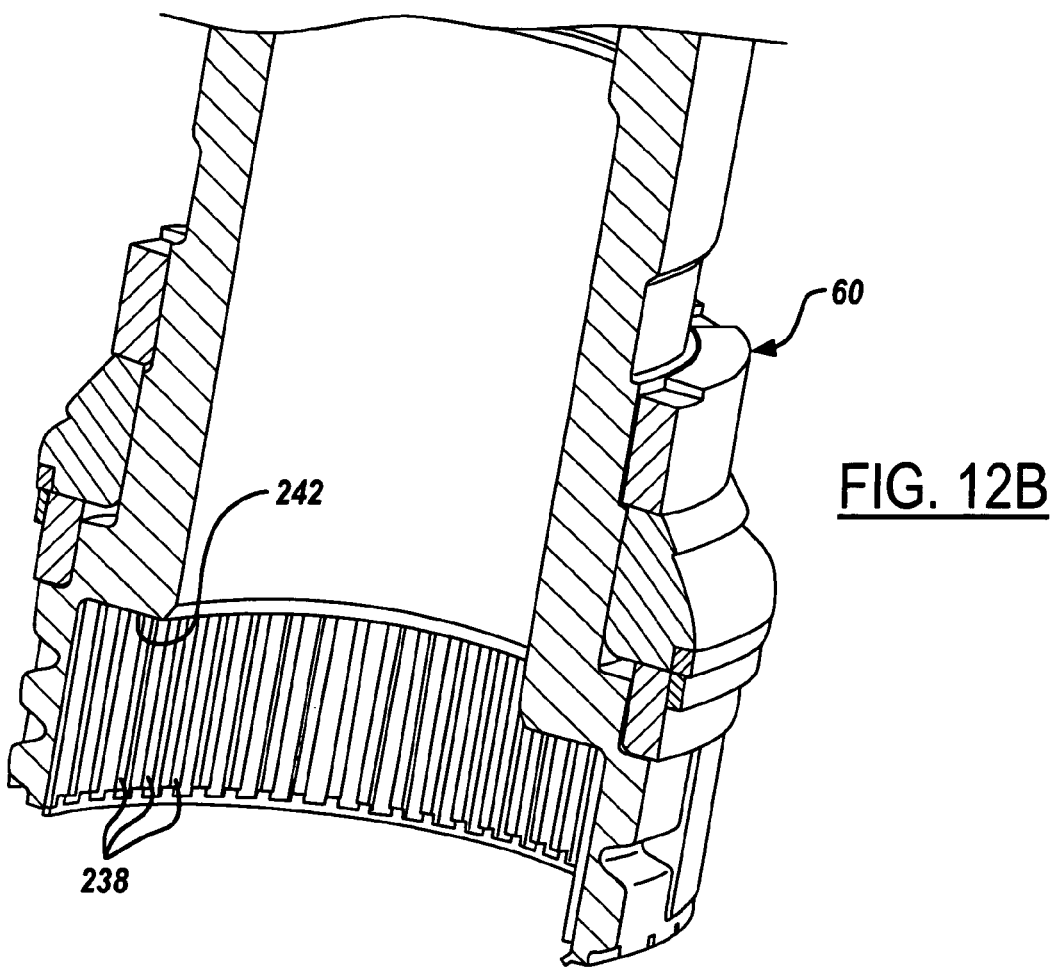
Figure 12C:
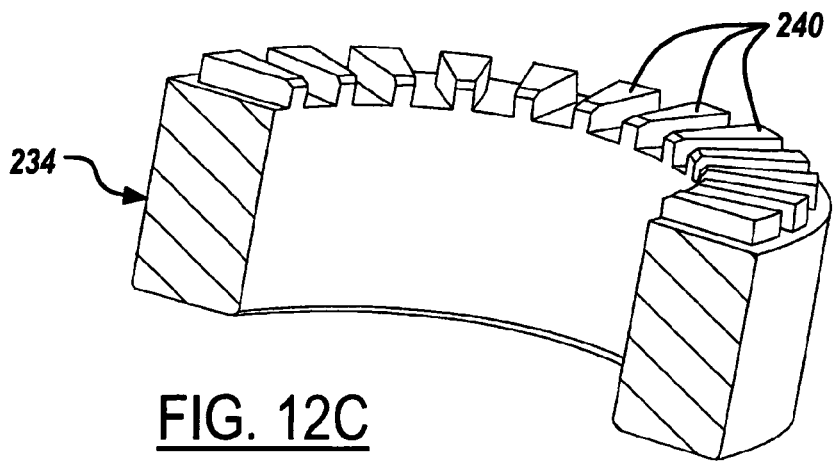

FIGS. 12-12E illustrate a mold core 220 (FIG. 6A) in accordance with another aspect and embodiment of the disclosure. Elements in FIGS. 12A-12E that are identical or similar to elements previously discussed, particularly in connection with FIG. 6A, are indicated by correspondingly identical reference numerals. Mold core 220 includes a forming pin 222 (FIGS. 12 and 12E) having an end wall 224 contoured to form the molded component in question, such as the interior of a closure shell base wall or the interior surface of a sealing liner in accordance with some preferred implementations of the disclosure. The end 225 of core forming pin 222 opposed to end wall 224 forms a hollow interior 226 that preferably is concentric with forming pin sleeve 60 (FIGS. 12 and 12B). The external surface of end 225 extends radially outwardly from the body 227 of the forming pin, and a sleeve 228 (FIGS. 12 and 12D) extends axially from core pin end 225 surrounding body 227. Thus, there is a first annular passage 230 between sleeve 228 and body 227 of forming pin 222, and a second annular passage 232 between the radially outer surface of sleeve 228 and the inner surface of sleeve 60. The end of sleeve 228 preferably is spaced from the interior surface of pin end wall 224, and a ring 234 (FIGS. 12 and 12C) is secured around the end of sleeve 228. Ring 234 preferably is disposed in an annular pocket within the end of sleeve 60. Sleeve 228 can be connected to end 225 and ring 234 by any suitable means, such as e-beam welding. The end of sleeve 60 has an internal shoulder 244 against which forming pin end wall 224 is seated, and the sleeve and forming pin end wall are joined at 246 (FIG. 11), preferably by e-beam welding. Shoulder 244 prevents burn-through during welding.

The mold stack embodiment of FIGS. 6A-6B is similar to that of FIGS. 12-12E, except that the sleeve 228 is threaded at 442 to sleeve 60 in FIG. 6A, so that there is no need for e-beam welding in FIGS. 6A-6B.

A plurality of radially extending fins or ribs 236 (FIGS. 12 and 12E) preferably are formed on the inner surface of pin end wall 224. These ribs 236 extend from the outer surface of pin body 227 to a position adjacent to but spaced from the outer periphery of end wall 224. The lower surface ("lower" in the orientation of FIGS. 12 and 12C) of ring 234 preferably abuts the upper surfaces of ribs 236, so that the channels between the ribs form coolant passages between ring 234 and pin end wall 224. A circumferential array of angularly spaced axially extending ribs 238 (FIGS. 12 and 12B) on the inside surfaces of sleeve 60 preferably abut ring 234 in assembly, so that the channels between the ribs form axial coolant passages between ring 234 and sleeve 60. A circumferential array of angularly spaced radially extending ribs or fins 240 (FIGS. 12 and 12C) on the upper surface of ring 234 (in the orientation of FIGS. 12 and 12C) preferably abut an opposing internal shoulder 242 on sleeve 60 to form radial coolant passages between ring 234 and shoulder 242. Thus, coolant preferably is circulated from within tube 64 to interior 226 of forming pin 222, through radially extending passages 248 in the forming pin into annular passage 230, axially along annular passage 230, through the radially extending passages formed by ribs 236 between end wall 224 and ring 234, axially through the channels formed by ribs 238 between ring 234 and sleeve 60, radially inwardly through the channels formed by ribs 240 between ring 234 and shoulder 242, and thence axially through annular passage 232 to the coolant return. (The coolant flow direction less preferably can be reversed.) The cross-sectional area to coolant flow preferably is at a minimum in the axial channels formed by ribs 238 between ring 234 and sleeve 60 to maximize the heat transfer in this area.

In accordance with another aspect of the present disclosure, forming pin 222 may have a concentric axial passage 250 (FIGS. 12 and 12E) that extends from interior 226 to the end face 252 of end wall 224. A poppet valve 254 (FIG. 12) has an axially extending cylindrical body 256 that extends through passage 250, and an enlarged conical head 258 adjacent to end face 252. A coil spring 260 preferably is captured in compression between a retaining ring 262 on valve body 256 and an opposing axially facing surface 264 on pin body 227 within interior 226. Thus, spring 260 normally holds valve 254 in the closed position illustrated in FIG. 12. Air tube 66, which preferably is concentrically disposed within coolant tube 64, is coupled to a collar 266 disposed within hollow interior 226 of core pin 222 between openings 248 and valve 254. A resilient sealing ring 268 preferably is disposed within a channel 270 on collar 266 in sealing engagement with the opposed interior surface of pin interior 226. Collar 266 with sealing ring 268 cooperates with the hollow interior of forming pin 222 to form a sealed air cavity 272 that is connected to air tube 66. When tube 66 (or any other suitable passage) is supplied with air under pressure (e.g., by spool valve 400 in FIG. 6B), poppet valve 254 moves outwardly against the force of spring 260. This bodily movement of the poppet valve not only itself assists stripping of molded articles from end of core pin 220, but also feeds air under pressure through end wall 224 further to assist stripping of the molded articles. In this connection, it will be recognized that poppet body 256, 258 could be actuated mechanically, such as by a rod, rather than by air pressure.

Figure 13A:
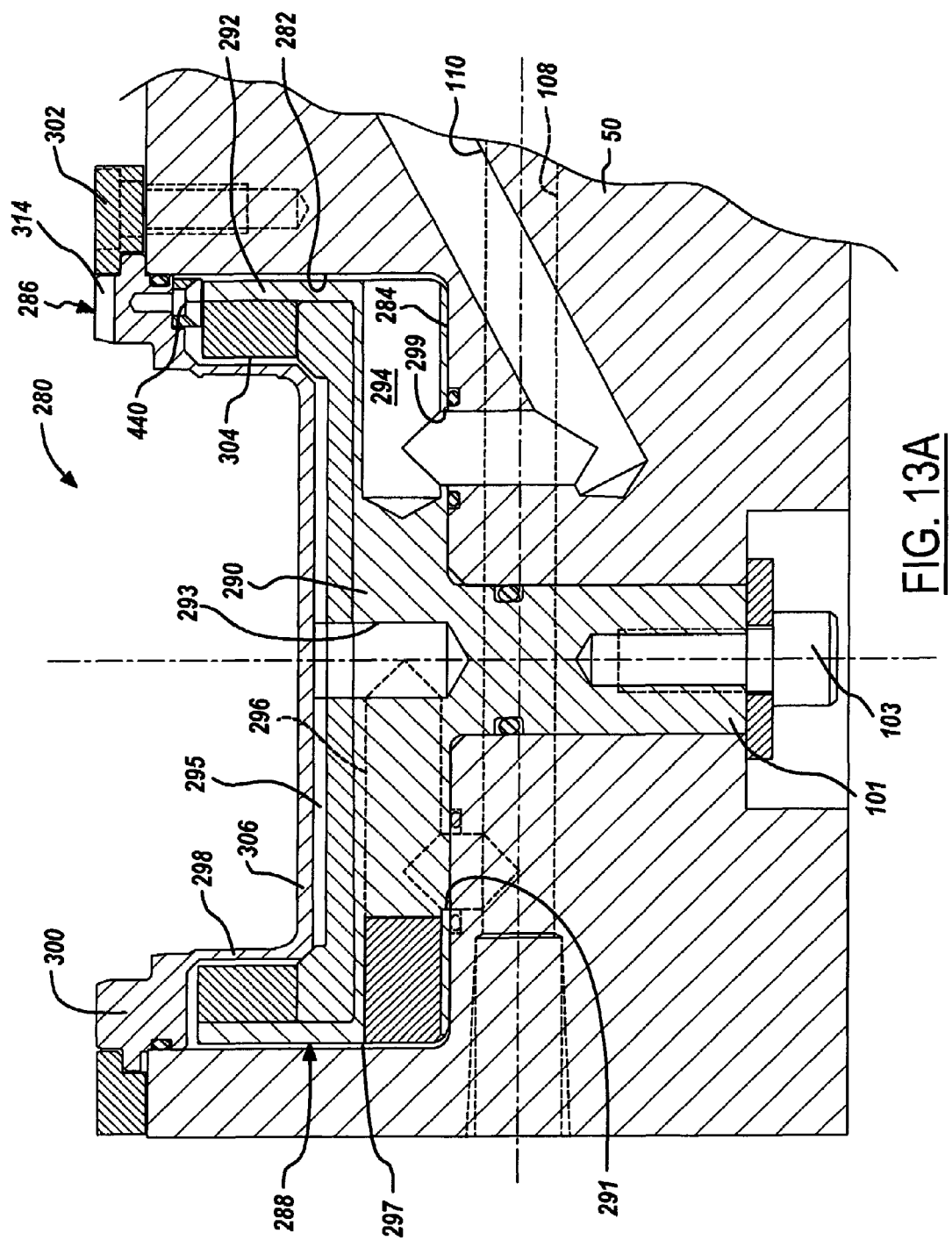
FIG. 13A is a fragmentary sectional view that illustrates the mold cavity in the embodiment of FIGS. 6A-6B.
Figure 13B:
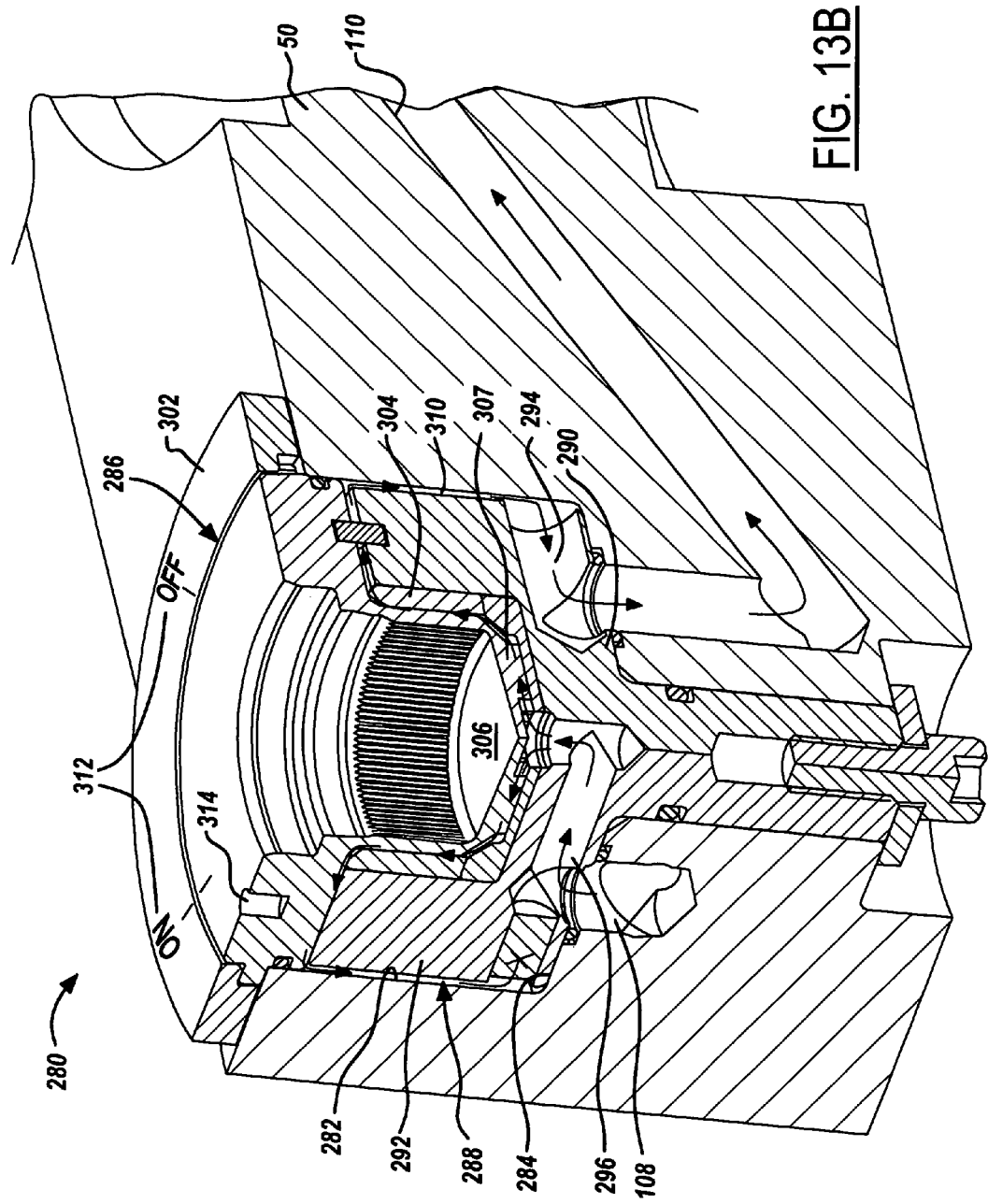
FIG. 13B is a fragmentary sectioned perspective view of the cavity and underlying support in FIG. 13A.

FIGS. 13A and 13B illustrate a mold cavity 280 in accordance with yet another aspect of the present disclosure. Mold cavity 280 preferably is disposed in a pocket 282 on crossbar 50 (or other suitable mold support structure). Coolant feed and return passages 108,110 in crossbar 50 open at the axially facing bottom surface 284 of pocket 282. Mold cavity 280 preferably includes a mold cavity insert 286 secured within a mold cavity seat 288. Mold cavity seat 288 preferably is cup-shaped, having an axially facing base 290 opposed to bottom surface 284 of pocket 282, and an annular rim 292 with a radially outwardly facing surface opposed to the radially inwardly facing surface of pocket 282. Base 290 of seat 288 has a first opening 291 that opens to coolant passage 108 in bar 50. Opening 291 communicates through passage 296 and a central passage 293 to a cup-shaped space 295 between the upper surface of seat 288 and the undersurface of insert 286. This cup-shaped space 295 communicates around the edge of seat 288 with an annular space 297 between the outer periphery of seat 288 and the inner periphery of pocket 282. This space 297 connects through a passage 294 with an opening 299 in base 290, and thence to coolant passage 110 in bar 50. Seat 288 extends at 101 for securement to crossbar 50 by screw 103, as previously described. Cavity insert 286 preferably is generally cup-shaped, having a body 298 within rim 292 of seat 288, and a radially outwardly extending lip or flange 300 that overlies the end of seat 288. Rim 300 is secured to crossbar 50 by a cavity retaining ring 302. Thus, coolant can circulate from passage 108 in crossbar 50 through opening 291 and passage 296 in seat base 290, through passage 293 to space 295, through passages 297 and 294, and through opening 299 to passage 110 in bar 50. (Coolant flow could be in the reverse direction.)

In accordance with a preferred feature of this aspect of the disclosure, cavity insert 286 and seat 288 are rotatable conjointly and bodily within pocket 282 of crossbar 50 selectively to move cavity 280 between the position illustrated in FIGS. 13A and 13B for permitting circulation of coolant, and an angularly spaced position for blocking circulation of coolant. A key 440 (FIG. 13A) couples cavity insert 286 to seat 288 so that the insert and seat rotate together. For this purpose, indicia 312 preferably are provided on insert rim 300 and retaining ring 302 to indicate whether mold cavity 280 is open or closed to coolant circulation. Pockets 314 or the like preferably are provided in insert rim 300 for cooperation with a suitable tool to rotate the cavity between the open and closed positions for coolant circulation. Thus, ring 302 may be loosened and the cavity insert and seat rotated conjointly so that openings 291, 299 in seat 288 no longer register with passages 108, 110 in bar 50.

FIGS. 14-18 illustrate a mold charge placement apparatus 130 (FIG. 1) in accordance with another aspect of the present disclosure. Mold charge placement apparatus 130 in FIGS. 14-18 includes a plate 320, preferably circular, coupled to a collar 322 for rotation around a first axis coaxial with plate 320 and collar 322. This axis of rotation preferably is a vertical axis in one preferred implementation in combination with a mold wheel 22 that rotates around a horizontal axis. It will be recognized that wheel 22 and mold sections 56 carried thereby are illustrated only schematically in FIGS. 14-18. It will be noted that mold charge placement apparatus 130 can be used equally as well in combination with a vertical axis carousel-type compression molding machine, in which the mold cavities 56 are presented horizontally in sequence adjacent to the periphery of plate 320. Placement apparatus 130 can be used for placing mold charges for compression molding closure shells (FIGS. 1-6B) or for compression molding lines in premade shells (FIG. 8).

At least one mold charge cutter and placement mechanism 324 is disposed at the periphery of wheel 320 for severing mold charges from an extruder nozzle 325, transporting the mold charges to mold sections 56 in sequence and placing the mold charges into the mold sections. In the illustrated embodiment, there are a pair of mold charge cutting and placement mechanisms 324 positioned on diametrically opposite sides of plate 320. A greater number of mechanisms 324 can be placed around plate 320, preferably at equal angular increments. Mechanisms 324 preferably are identical in construction. Each mechanism 324 preferably includes a bearing block 326 mounted adjacent to the periphery of plate 320, and a driven shaft 328 that extends through bearing block 326 for rotation around a second axis perpendicular to the axis of rotation of plate 320. The axes of rotation of driven shafts 328 preferably are colinear. An arm 330 extends from the end of each shaft 328 at an angle to the axis of shaft rotation, preferably perpendicular to the axis of shaft rotation. A radially outwardly opening hollow cup 332 is mounted at the end of each arm 330. Thus, each cup 332 rotates around the axis of shaft 328, and shafts 328 are rotated around the axis of plate 320. A knife block 334 is mounted on each bearing block 332 in this embodiment. A cutter blade or knife 336 extends from each block 334 over shaft 328 and at an angle to the axis of shaft 328. Cutter blades 336 passed in sequence beneath the outlet of nozzle 326 to sever a mold charge 338 from nozzle 325 as the associated cup 332 is positioned beneath the nozzle.

The inner end of each shaft 328 is coupled to a gear 340. Gears 340 in turn are coupled to a gear 342 that is mounted on the end of a drive shaft 344 that extends through collar 322 coaxially with the collar. Thus, rotation of drive shaft 344 is imparted by gears 340, 342 to driven shafts 328, arms 330 and cups 332. Collar 322 and drive shaft 344 are coupled to suitable means 346 for controlling rotation of the collar and drive shaft around the first axis. These control means 346 are illustrated in FIG. 14 as comprising a first motor 348 coupled to collar 322 and a second motor 350 coupled to drive shaft 344. Motors 348, 350 are connected to a suitable control 352 for rotating collar 322 and plate 320, and drive shaft 344 and cups 322, in synchronism, but preferably independently of each other. Motors 348, 350 may comprise independently controllable servo motors. As an alternative, drive shaft 344 and collar 322 could be coupled by suitable gears, pulleys and the like to drive motor 36 (FIG. 1) for rotating wheel 322.

In operation, mold charges 338 of suitable resin material are severed from nozzle 325 by cutter blades 336 as mechanisms 324 pass in turn beneath nozzle 325. As a mold charge 338 is severed, arm 330 and cup 332 preferably are oriented vertically upwardly (schematically in FIG. 15) to receive the severed mold charge. Continued rotation of shaft 328, arm 330 and cup 332 in the direction 360 (from the position shown in solid lines in FIG. 15, through the positions of FIGS. 14 and 16, to the position of FIG. 17 and in phantom in FIG. 15) transports mold charge 338 to a downwardly oriented position, at which point cup 332 and mold charge 338 are disposed within a mold section 56 for placing the mold charge. Surface tension between the molten charge 338, and cup 332 and mold section 56, can be used to hold and transfer the mold charge. However, capture, transport and release of the mold charge more preferably are assisted by a control 354 (FIG. 15) coupled to each cup 332 through the associated shaft 328 and arm 330. Control 354 selectively applies vacuum to cup 332 for capturing and holding severed mold charge 338 within the cup until the cup is disposed within a mold section 56, and selectively applies air under pressure through shaft 328, arm 330 and cup 332 to assist release and placement of mold charge 338 within mold section 56. Thus, each mold charge 338 is placed affirmatively within a mold section 56, so that placement of the mold charge is controlled to enhance flow of material during the compression molding operation. This controlled charge placement may be contrasted with prior art techniques, which typically involve free-fall of the mold charge into the mold section, sometimes assisted by air pressure and/or vertical acceleration of the placement mechanism at the time of release, which can result in non-ideal placement of the mold charge in the mold section and non-uniform flow of material during compression molding.

Figure 16:
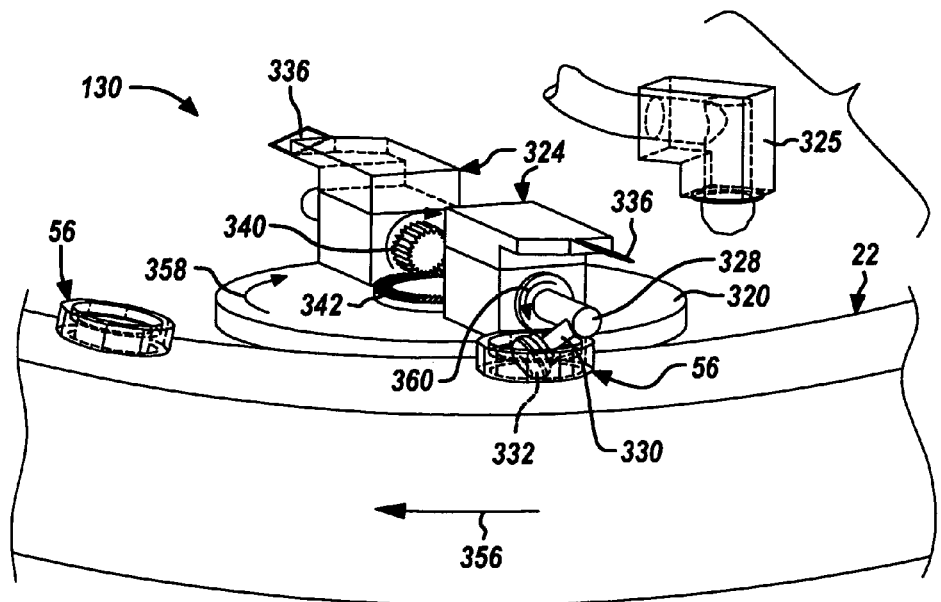
FIGS. 16, 17 and 18 are schematic diagrams that illustrate sequential stages of operation of the placement apparatus of FIG. 14.
Figure 17:
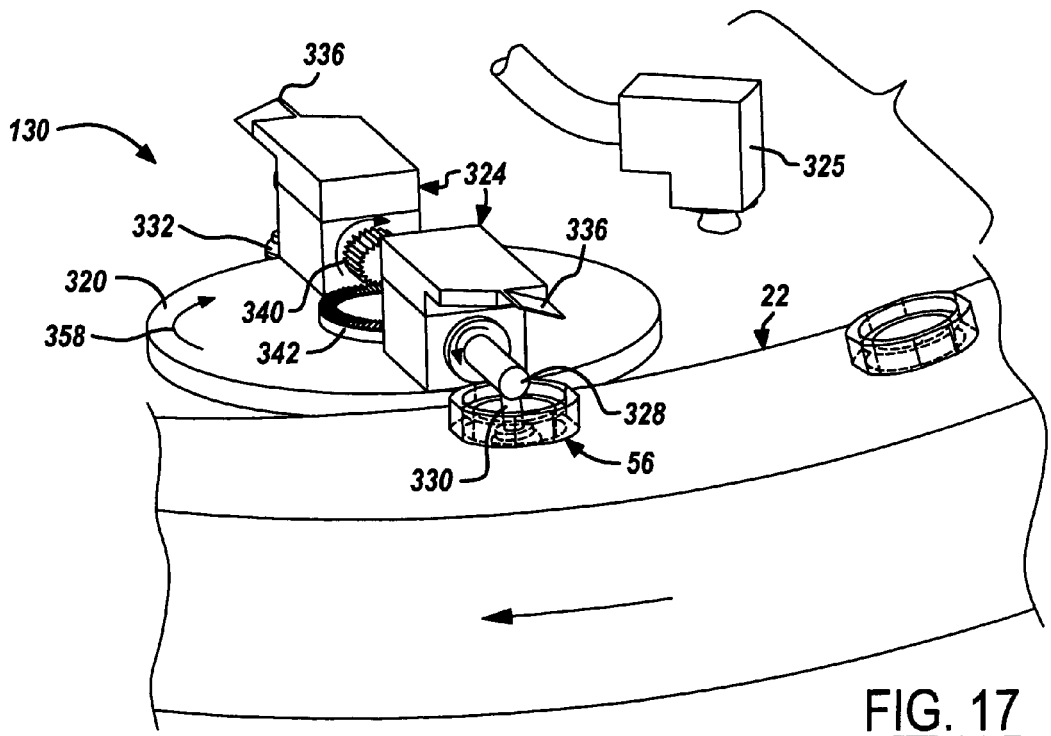
Figure 18:
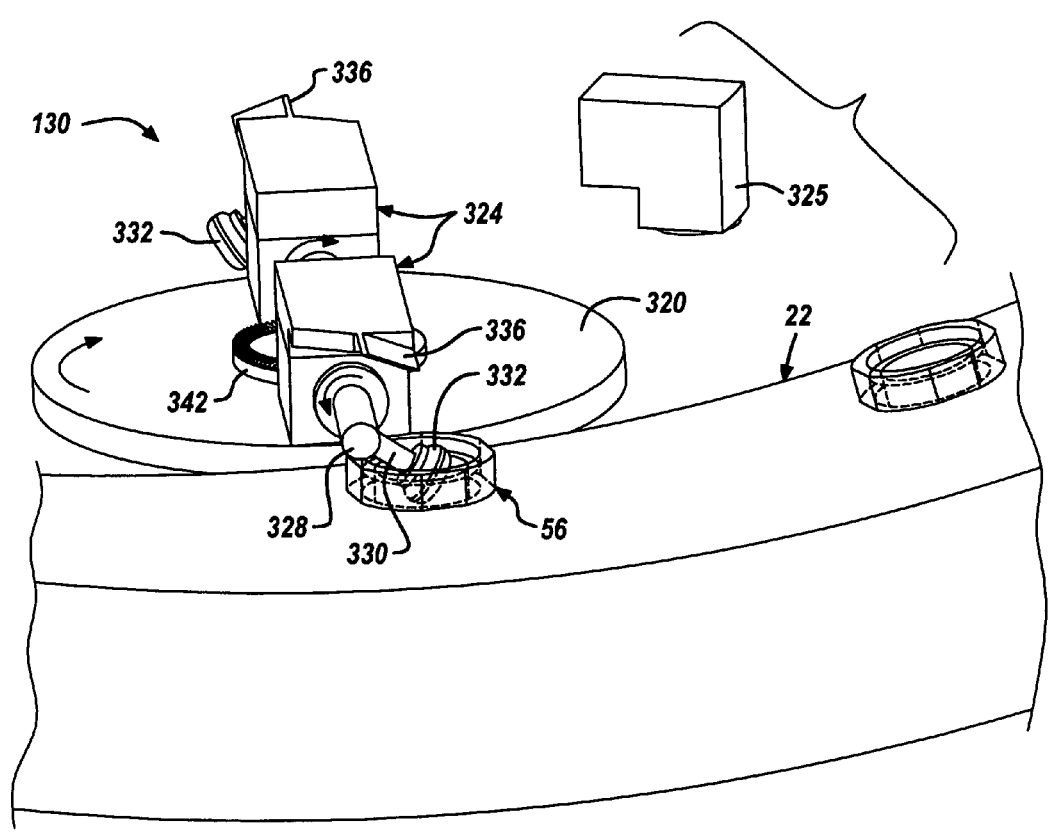

FIG. 16 illustrates initial entry of mold charge placement arm 330 and cup 332 into a mold section 56 as wheel 22 rotates in the direction 356, plate 320 rotates in the direction 358 and shaft 328 rotates in the direction 360. Further rotation of wheel 22, shaft 328 and plate 320 bring arm 330 to the vertical orientation illustrated in FIGS. 15 and 17, at which point the mold charge is released into the mold section. Further rotation begins to remove arm 330 and cup 332 from section 56, as illustrated in FIG. 18. It will be noted that the speed of rotation of plate 358 is such that arm 330 and cup 332 are removed from mold section 56 while wheel 22 continuously rotates and without interference of the arm and cup with the edges of cavity 56. Plate 320 preferably rotates in the direction 358 at constant angular velocity, and shafts 328, arms 330 and cups 332 preferably rotate in the direction 360 at constant angular velocity. Wheel 22 preferably rotates in the direction 356 at constant angular velocity. It will be noted in FIG. 14 that, when one of the cups 332 is in a charge placement position in a mold section 56, the cup 332 on the opposing side of plate 320 is also in a downward orientation. Thus, during machine start-up, charge 338 can be retained in cup 332 rather than placed in mold section 56, and then ejected for scrap or recycle on the opposing side of plate 320.

FIGS. 19-22 illustrate another exemplary mold charge placement apparatus 130 (FIG. 2) in accordance with the present disclosure. Reference numerals in FIGS. 19-22 that are identical to those in FIGS. 14-18 illustrate identical or related components. The discussion of FIGS. 19-22 will be directed primarily to the differences between the embodiment of FIGS. 19-22 and that of FIGS. 14-18.

In the embodiment of FIGS. 19-22, extruder nozzle 325 is parallel to but laterally offset from the axis of sleeve 322 and shaft 344. A pellet cutter knife 392 is coupled to a shaft 394 for rotation along a plate 396 over the outlet of nozzle 325. Sleeve 322 and shaft 394 are coupled by a belt 345 to motor 346. Shaft 344 is stationary—i.e., does not rotate—in this embodiment. Shaft 344 is coupled to frame 436 by a mechanism 438 (FIG. 21) for adjusting the timing of shaft 344 and gear 342 relative to sleeve 322 and plate 320. Motor 346 is connected to a suitable control 352 for rotating collar 322 and plate 320, and drive shaft 394 and blade 392, in synchronism with wheel 22. Motor 346 may comprise an independently controllable servo motor. As an alternative, drive shafts 344, 394 could be coupled by suitable gears, pulleys and the like to drive motor 36 (FIGS. 1 and 2). Hot melt from an extruder is fed to nozzle 325 by a metering pump 382 (FIG. 17), a passage 384 and a diverter gate 386. Diverter gate 386 is coupled by an arm 388 to a cylinder or actuator 390.

In operation, mold charges of suitable resin material are severed from nozzle 325 by cutter knife 336 as mechanisms 324 pass in turn over nozzle 325. As the mold charge is severed, arm 330 and cup 332 preferably are oriented vertically downwardly to receive the severed mold charge. Continued rotation of shaft 328, arm 330 and cup 332 transports the mold charge to a downwardly oriented position at which cup 332 and mold charge 338 are disposed within a mold section 56 for placing the mold charge. Surface tension between the molten charge and cup 332 and the mold section can be used to hold and transfer the mold charge. However, capture, transport and release of the mold charge more preferably are assisted by a control 354 (FIG. 15) coupled to each cup 332 through the associated shaft 328 and arm 330. Control 354 selectively applies vacuum to cup 332 for capturing and holding severed the mold charge within the cup until the cup is disposed within a mold section 56, and selectively applies air under pressure through shaft 328, arm 330 and cup 332 to assist release and placement of the mold charge within mold section 56. Thus, each mold charge is placed affirmatively within a mold section 56, so that placement of the mold charge is controlled to enhance flow of material during the compression molding operation.

Figure 19:
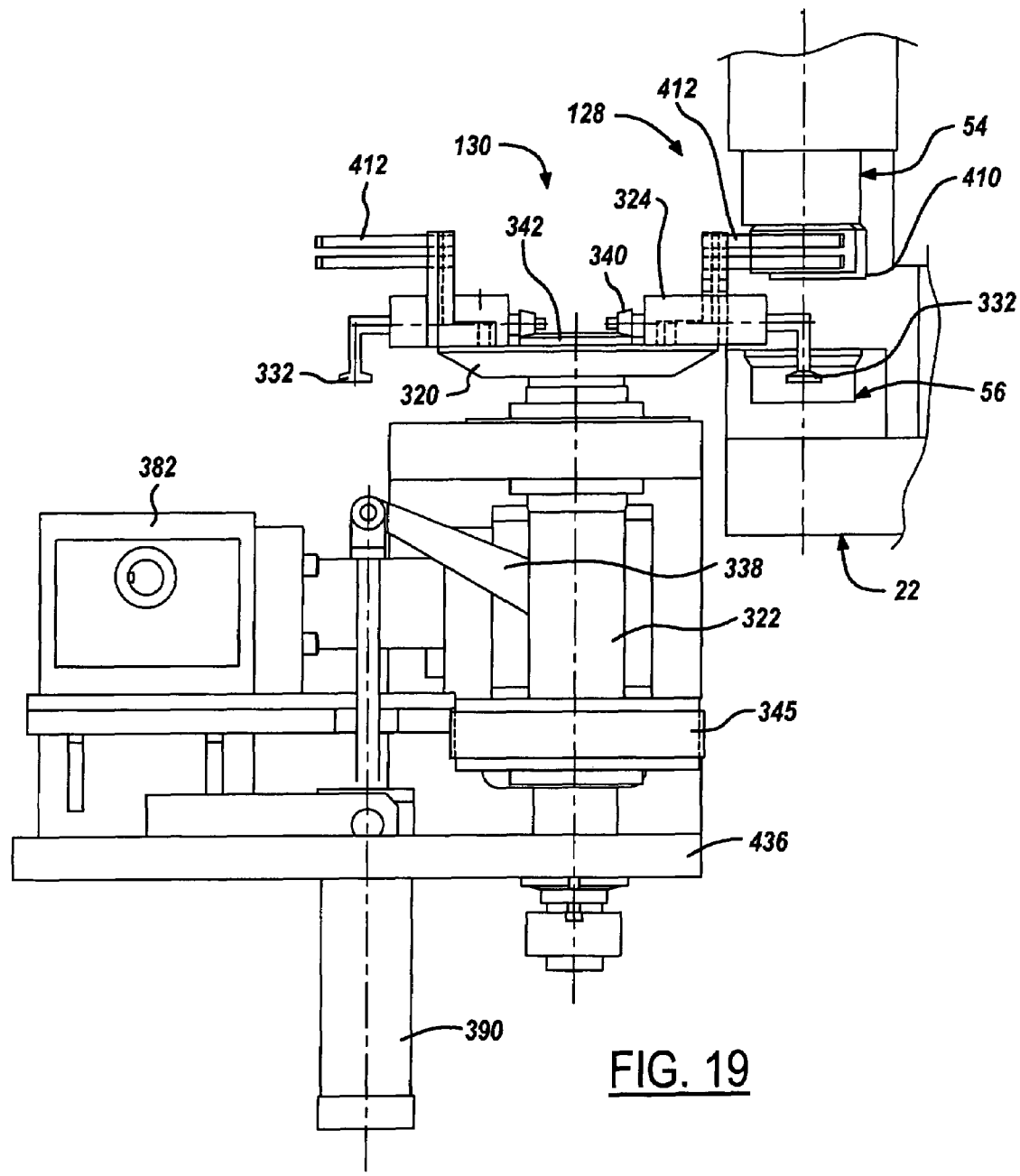
FIG. 19 is a fragmentary elevational view on an enlarged scale of the mold charge placement mechanism of FIG. 1 in accordance with another aspect of the disclosure.
Figure 20:
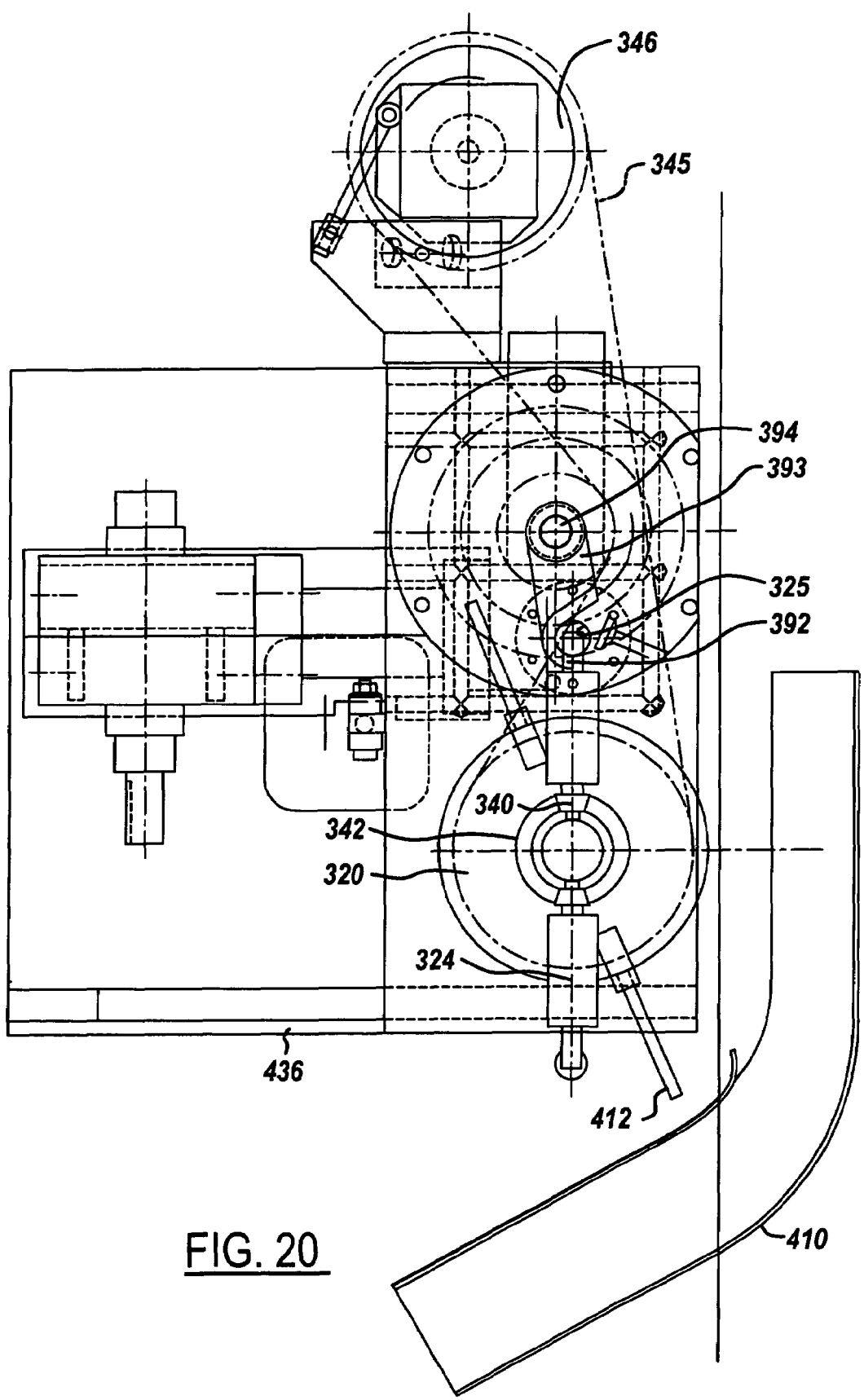
FIG. 20 is a top plan view of the mechanism of FIG. 19.
Figure 21:
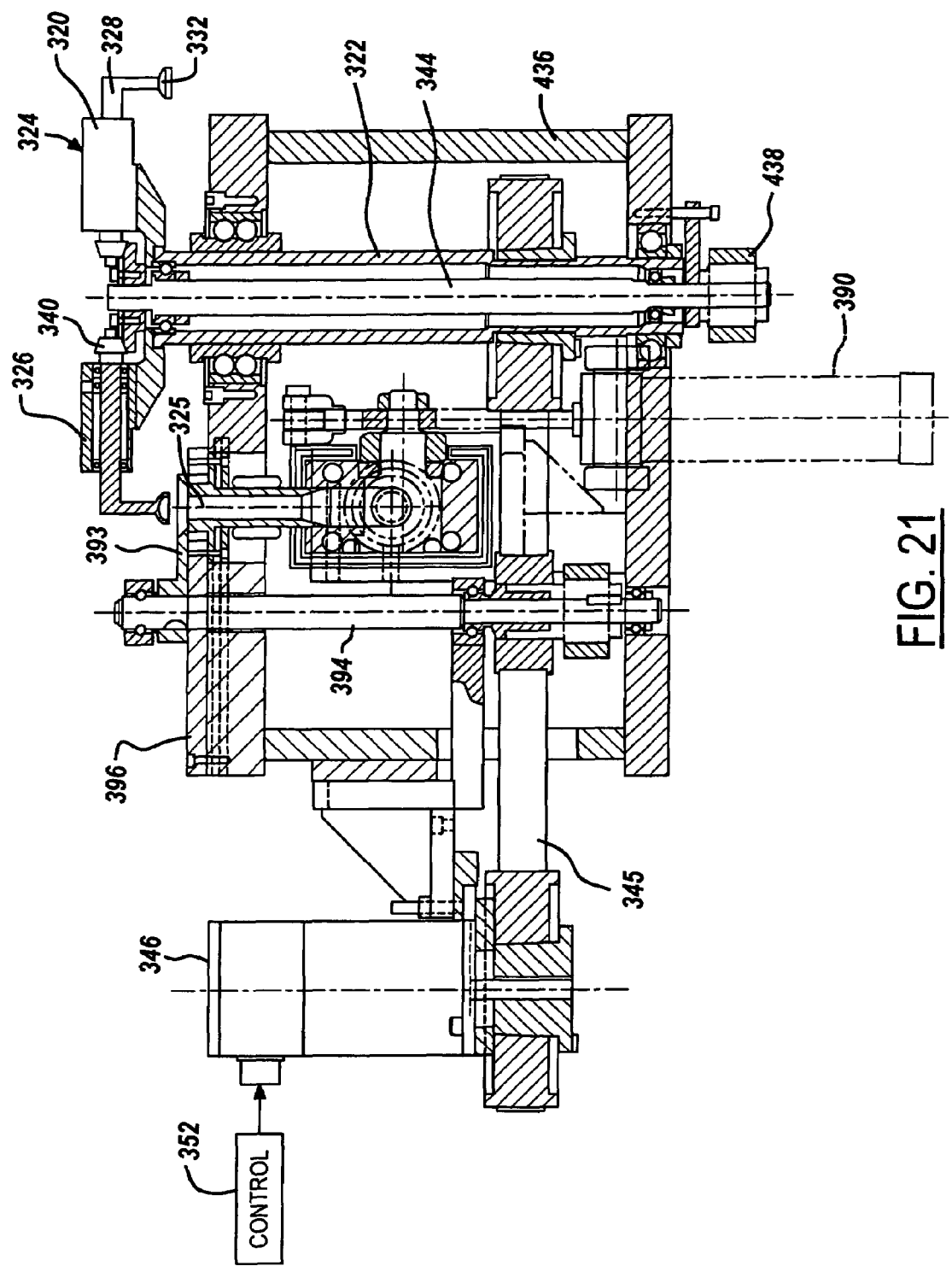
FIGS. 21 and 22 are sectional views of the mechanism of FIGS. 19 and 20.
Figure 22:
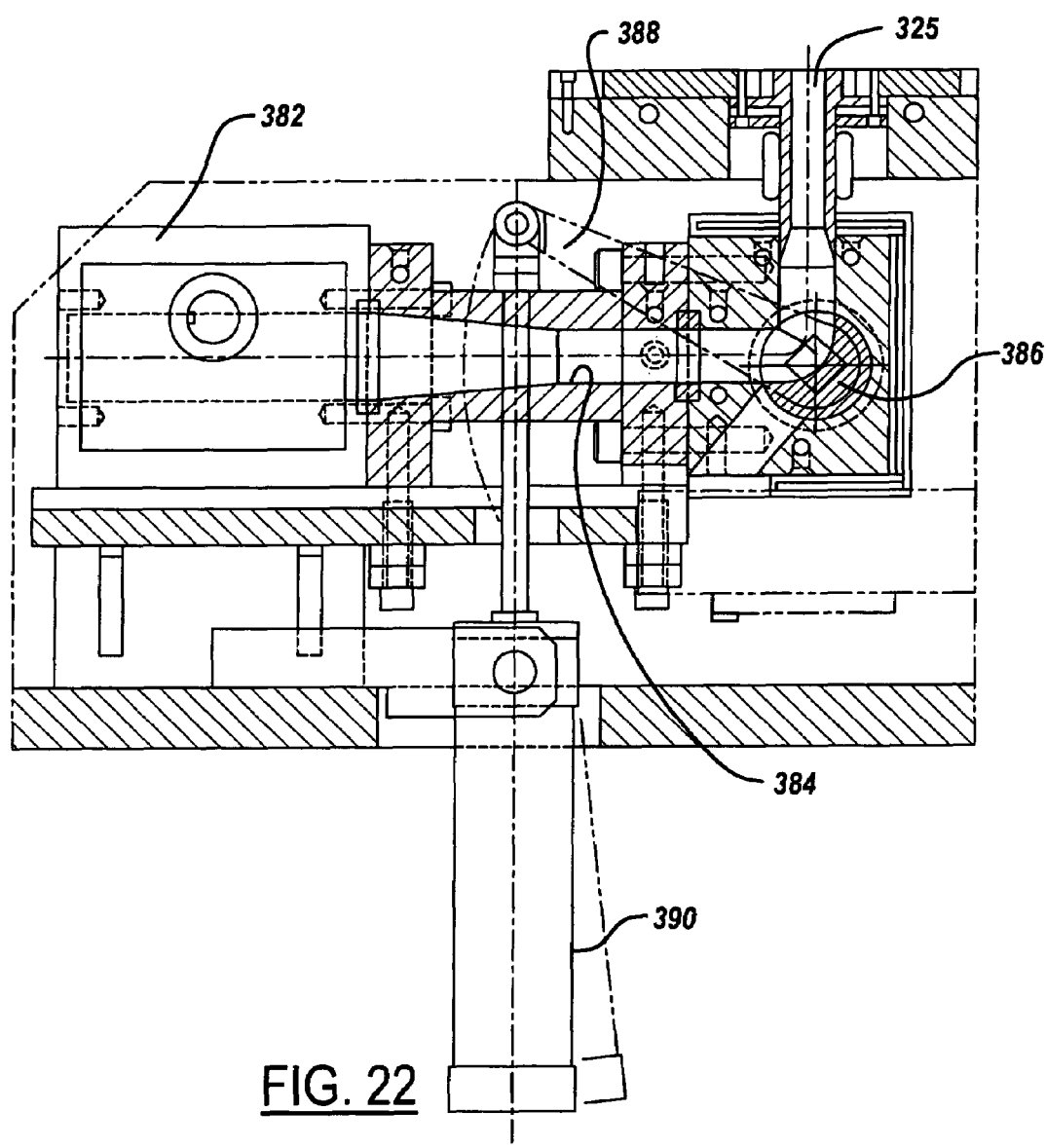

FIGS. 1, 19 and 20 also illustrate an example of molded part removal apparatus 128. A chute 410 is positioned beneath mold segment 54 in the open position of the mold. Stripper sleeve 76 (FIG. 6A, for example) strips molded closure shells from the male mold core onto chute 410. One or more fingers 412 are carried by plate 320 of the mold charge placement mechanism to engage the molded closure shell on chute 410 and push the shell along the chute.

In the various disclosed embodiments, the first or inner mold segment is mounted against a suitable spring to control mold cavity pressure when the mold is closed. However, it also is contemplated that the first mold segments could be coupled to cams or hydraulics, for example, to move radially inwardly as the second mold segments are moved radially outwardly. This modification may be useful for molding plastic articles that are very long in the radial direction of the mold wheel.

Mold charge placement apparatus 130 and mold charge removal apparatus 128 in FIGS. 1 and 14-22 are the subject of U.S. patent application Ser. No. 11/156,115. Cam 126 and modifications in FIGS. 2, 2A and 9-11 are the subject of U.S. patent application Ser. No. 11/156,114. Mold core 54 (FIGS. 3B-3C, 4B-4C and 5) and 220 (FIGS. 6A-6B and 12-12E), and mold cavity 100 (FIGS. 3B, 4B and 5), 220 (FIG. 6A) and 280 (FIGS. 13A and 13B) are the subject of U.S. patent application Ser. No. 11/155,354.

There thus have been disclosed a machine and method for compression molding plastic articles, which fully satisfy all of the objects and aims previously set forth. The disclosure has been presented in conjunction with several presently preferred embodiments, and a number of additional modifications and variations have been discussed. Other modifications and variations readily will suggest themselves to persons of ordinary skill in the art. The disclosure is intended to embrace all such modifications and variations as fall within the spirit and broad scope of the appended claims.

The invention claimed is:

1. A method of compression molding plastic articles, which includes the steps of:
   (a) providing a wheel mounted for rotation around a horizontal axis and a plurality of angularly spaced molds disposed around said wheel, each of said molds including a first mold segment and a second mold segment disposed radially outwardly of said first mold segment,
   (b) rotating said wheel around said horizontal axis,
   (c) as said wheel rotates, radially moving each second mold segment in sequence with respect to the associated first mold segment between a radially inner closed position with said first mold segment and a radially outer open position spaced from the associated first mold segment,
   (d) with said mold segments in said open position, removing a molded article from said mold and placing a mold charge into said mold,
   (e) closing said mold segments as said wheel rotates to compression mold plastic articles between said mold segments, and
   (f) using radial motion of said second mold segment in said step (c) to remove the molded article from the mold in said step (d),
   wherein each of said first mold segments includes a male mold segment having a core and a stripper sleeve surrounding said core, and
   wherein said step (f) is carried out by operatively coupling at least one abutment to said stripper sleeve and spaced from said second mold segment in said closed position of said molds, said abutment being disposed for engagement by said second mold segment during motion of said second mold segment toward said open position to strip a molded part from said core as said second mold segment is moved radially outwardly toward said open position such that there is lost motion between said second mold segment and said abutment to allow said second mold segment to clear said mold core before initiating motion of said stripper sleeve.

2. The method set forth in claim 1 wherein said step (c) is carried out by positioning a cam adjacent to said wheel for engagement with said molds to open and close said molds in sequence as said wheel rotates.

3. The method set forth in claim 2 wherein said step (c) includes latching said mold segments to each other when said mold segments are in said closed position.

* * * * *